United States Patent [19]

Simonyi et al.

[11] Patent Number: 5,035,113
[45] Date of Patent: Jul. 30, 1991

[54] ELECTROPNEUMATIC REMOTE CONTROL FOR SHIFTING THE MECHANICAL TRANSMISSION OF A MOTOR VEHICLE

[75] Inventors: Sándor Simonyi, Salgótarján; László Töröcsik, Budapest; István Tóth; György Válóczi, both of Salgótarján, all of Hungary

[73] Assignee: Csepel Autógyár, Szigetszentmiklos, Hungary

[21] Appl. No.: 297,669

[22] Filed: Jan. 13, 1989

Related U.S. Application Data

[63] Continuation-in-part of Ser. No. 196,377, May 19, 1988, abandoned.

[51] Int. Cl.⁵ .................... F16H 61/24; F16H 59/10; F15B 15/26; F01B 7/04
[52] U.S. Cl. ........................ 60/390; 60/393; 92/19; 92/62; 92/65; 192/3.58; 74/335; 74/473 R; 91/361
[58] Field of Search ............ 60/390, 393; 364/424.1; 74/335, 473 R; 92/62, 65, 6 R, 75, 30, 18, 19; 192/3.54, 3.63, 3.58; 91/20, 24, 361

[56] References Cited

U.S. PATENT DOCUMENTS

| 3,490,291 | 1/1970 | Fitzpatrick et al. ............ 74/473 R |
| 4,002,105 | 1/1977 | Bell et al. ...................... 92/65 X |
| 4,125,059 | 11/1978 | Tuji ............................. 92/65 X |
| 4,543,856 | 10/1985 | Klatt ......................... 192/3.58 X |
| 4,559,895 | 12/1985 | Kijima et al. ................. 92/65 X |
| 4,593,606 | 6/1986 | Klatt et al. .................... 92/65 X |
| 4,621,328 | 11/1986 | Arai et al. .................... 74/335 X |
| 4,645,045 | 2/1987 | Takefuta .................. 364/424.1 X |
| 4,646,582 | 3/1987 | Kijima ....................... 74/473 R |
| 4,748,863 | 6/1988 | McNinch ..................... 74/335 |
| 4,800,721 | 1/1989 | Cemenska et al. ............. 60/393 |
| 4,944,194 | 7/1990 | Tanoue et al. ................ 74/335 |

FOREIGN PATENT DOCUMENTS 1002202 2/1957 Fed. Rep. of Germany .......... 92/62

Primary Examiner—John T. Kwon
Assistant Examiner—George Kapsalas
Attorney, Agent, or Firm—Schweitzer Cornman & Gross

[57] ABSTRACT

A remote control shifting system for a mechanical transmission. The transmission is operated by two pneumatic cylinders, a selecting cylinder operating in the direction of shift path selection and a shifting cylinder acting in the direction of shifting. The shifting cylinder operates with two force stages, a lower force for effecting synchronization of gears about to be engaged, and a higher force level for actually engaging or disengaging the selected gears. A remote shift control unit is designed to closely emulate the action of a direct-operating manual shift level. During the synchronizing phase, the shift lever moves easily in the shifting direction. After a preliminary movement, however, further movement is allowed only against considerable resistance, as if conventionally mechanically forcing gears into meshing engagement. After the remotely driven shift operation actually takes place, the shift level resistance is momentarily released, allowing the lever to be fully seated in its shift position, after which the lever is held in the shifted position, allowing movement out of shifted position only under applied resistance. The timing and feel of the system closely approximate that of a conventional, direct-actuation mechanical transmission.

11 Claims, 16 Drawing Sheets

ELECTROPNEUMATIC REMOTE CONTROL FOR SHIFTING THE MECHANICAL TRANSMISSION OF A MOTOR VEHICLE

This is a continuation-in-part of application Ser. No. 196,377, filed on May 19, 1988, now abandoned.

BACKGROUND OF THE INVENTION

The invention relates to a remote control device, by which the driver is able to perform gear change faultlessly at the synchronized mechanical transmission, having the illusion of the manual actuation of the traditional gear change lever.

It is a well known fact that in certain motor vehicles, in particular at motor vehicles with rear-drive engine, the transmission is remote from the driver. Accordingly, the gear changing element of the transmission cannot be actuated directly manually. Smaller distances may be bridged with a rod mechanism or a bowden. However, for motor vehicles or machines with an articulated design, where the driver is sitting on one of the articulated members, while the transmission is arranged on the other one, these solutions cannot be applied.

For solving the aforementioned problem, hydraulic and pneumatic systems have been developed. The essential feature of the hydraulic systems is that the driver, by means of a gear change lever, actuates pistons arranged in cylinders lying perpendicularly to each. The hydraulic liquid thus displaced actuates the pistons of remotely located working cylinders connected to the gear changing element of the transmission. Such solutions are described, e.g., in the DE-OS 25 10 392, DE-OS 27 00 837, DE-OS 29 35 377 as well as in the HU-PS 192 487.

Because hydraulic systems are based on direct force transmission, the driver may be forced to exert a rather considerable force owing to liquid friction.

With the solution described above, only motion and force are transferred, so the driver moves the gear change lever in the same way as if he were manipulating a traditional gear change lever.

With pneumatic systems the gear changing element of the transmission is connected to a shifting cylinder, arranged in the direction of shifting, and to a selection cylinder, arranged in the direction of selection. The switching cylinder and the selecting cylinder are connected to the pressurized air-system of the motor vehicle through valves. The driver manipulates said valves either mechanically or electrically. The only task of the driver is to press control buttons or to manipulate a controller arm, as would be done with automatic transmissions.

These systems, if they are simple, are highly inaccurate. The possibility of error on behalf of the driver is considerable. At the same time, the transmission gets damaged in a rather short time. On the other hand, better and more reliable systems are very complicated. For this reason development has shifted to systems which simulate manipulation of the traditional gear change lever to a certain extent.

An electropneumatic system is disclosed in the HU-PS 187 345. In this case a remote control unit is installed beside the driver and the driver moves the lever of the remote control according to the traditional shifting pattern. In every operative position the lever of remote control actuates an individual electric shift, and these are used for switching solenoid valves controlling the pneumatic shifting and selecting cylinders actuating the gear change element. This system does not, however, inform the driver on the process of gear change. At best, the end of the process is displayed by the signal lamp. As the operation of the pneumatic working cylinders normally is too hard, throttle valves used to be inserted before them. However, this solution is recommended only for transmissions which are connected to the motor through a hydrodynamic torque converter.

Essentially, the remote control unit disclosed in the DE-OS 31 38 827 can be applied to the same system. This arrangement contains electromagnets and sensors in a proper quantity such that each signal combination corresponds to a separate shift position of the remote control lever.

The remote shift unit disclosed in the U.S. Pat. No. 4,646,582 was developed for a similar purpose. Compared to the previously described solution, this embodiment is more safe, as a spring-loaded spherical locating device fixes the shift lever in its adjusted position. Furthermore, it is provided with a pneumatically actuated construction which keeps the remote control lever in its middle position as long as the requirements of gear change are met in the gear change element.

The remote shift, as described in the U.S. Pat. No. 4,516,669, effectively excludes the possibility of error on behalf of the driver and actuates the gear change element with increased safety. Gear change is possible in the released state of the clutch only, and the clutch can be closed only after having finished gear change in due order.

The U.S. Pat. No. 4,633,987 discloses a remote control device which is controlled exclusively pneumatically. This is active also in the released state of the clutch, and the remote shifting lever can be brought into the extreme position of the shifting path only after having finished the shifting process. This is the task of pneumatic cylinders.

A more suitable solution is specified in the U.S. Pat. No. 4, 646,870. This is an electropneumatic remote shifting unit, with which displacement of the remote shifting lever and displacement of the gear change element of the transmission are controlled by analog signal transmitters, namely potentiometers. With this embodiment, a pneumatic working cylinder hinders the displacement of the remote shifting lever into the extreme position prior to finishing the gear change.

While known remote shifting means meet several requirements, they are still not considered as complete. It is a well known fact that with synchronized transmission's gear change is performed in two stages. First of all synchronizing means are actuated and only after having finished synchronization, does the actual gear change take place. Synchronizing requires a smaller force, and gear change a higher force. These two stages are easily sensed by the driver on the traditional gear change lever, representing the most important prerequisite of smooth gear change.

SUMMARY OF THE INVENTION

Accordingly, the aim of our invention is to develop an electropneumatic remote shifting unit, which simulates completely the careful operation of the gear change lever by the driver, and at the same time simulates perfectly the course of gear changing for the driver. The invention is based on the recognition that by using a proper pneumatic working cylinder or proper pneumatic fittings, forces of different magnitude as are needed in the course of shifting gears, can be established. Simultaneously, by using signal transmitters in the required number and a braking-locking device, motion of the driver's shift control lever can be controlled with respect to the extent of displacement, as well as the force needed for displacement, similarly to the motion of the traditional gear change lever.

Accordingly, the invention relates to an electropneumatic remote shifting unit, in particular for shifting the gears of a synchronized mechanical transmission of a motor vehicle, wherein there is a pneumatic selecting cylinder, arranged in the selecting direction and having an operative connection with the gear changing element of the transmission, and with respect to which the number of available positions corresponds to the number of available shifting paths. In addition, a three-way shifting cylinder is arranged in the direction of shifting. The selecting cylinder and the shifting cylinder are connected to a source of pressurized air through solenoid valves. The unit contains a remote shifting unit operated by the driver, having a shift control lever with positions corresponding to the gear change pattern of the transmission. The shift control is connected to signal transmitters arranged in the directions of selection and shifting, respectively, and said signal transmitters are connected with the solenoid valves via a control unit.

The device can be characterized in that in the extreme position the shifting cylinder has two stages, one for a smaller and one for a higher compressive force. The number of the transmitters contained in the remote shifting unit, arranged in the direction of selection, corresponds to the number of paths of shifting. In the direction of shifting, at least two signal transmitters each are arranged symmetrically to the central position. The signal transmitters closer to the central position are connected to valves which produce the stage of smaller compressive force, while the signal transmitters located farther from the central position control valves which produce a higher compressive force. The shifting cylinder is provided with at least one signal transmitter indicating the end position. In the driver's control unit the control lever is connected to a braking-locking device actuated with auxiliary energy, which is connected to the signal transmitters arranged in direction of shifting.

In a preferred embodiment of the device according to the invention the driver's control contains a transmitter element arranged to move in the direction of shifting. Openings are provided in the signal transmitting element. In the path of motion of the openings, at least two photo detectors are arranged. The visual fields of the detectors are displaced in relation to each other, expediently by about half of the visual field. The signal transmitting element also has a single central opening and an additional photo detector is arranged which generates an electric control signal in the central position of the shift lever.

Pursuant to one feature of the invention the braking-locking means of the shift control unit is provided which consists of a slide connected with the shift lever for a movement in the direction of shifting, and an electromagnet acting perpendicularly to the frictional surface of the slide. While the frictional force generated on the frictional surface of the electromagnet is less than the manual force exerted onto the slide by means of the shift lever, it strongly resists movement and signals the driver of a condition requiring a waiting interval.

In a further preferred embodiment of the invention, on the slide of the braking-locking means two impact surfaces are formed. The shift lever is arranged between these surfaces. The distance between the impact surfaces is larger than the size of the shift lever and the lever is supported to slide in the direction of the impact surfaces by means of two opposed springs with identical spring forces.

The invention will be described in detail by means of some preferred embodiments serving as examples, with references to the accompanying drawings.

DETAILED DESCRIPTION OF THE PREFERRED EMBODIMENTS

As with electropneumatic systems in general, remote shifting of the transmission requires three fundamental units, namely a driver's control unit, executing elements built onto the transmission, and a control unit establishing the connection therebetween. These can be developed and built up individually. They are not subordinated to each other. One has only to provide for well harmonized interconnections.

To facilitate our own work we shall describe the invention by the detailed presentation of the shift control unit, which was actually built. For the sake of order it should be emphasized that every single element of the arrangement to be described can be replaced by any other suitably designed element. This fact will be demonstrated by further examples in accordance with prevailing necessity.

Figure 1:
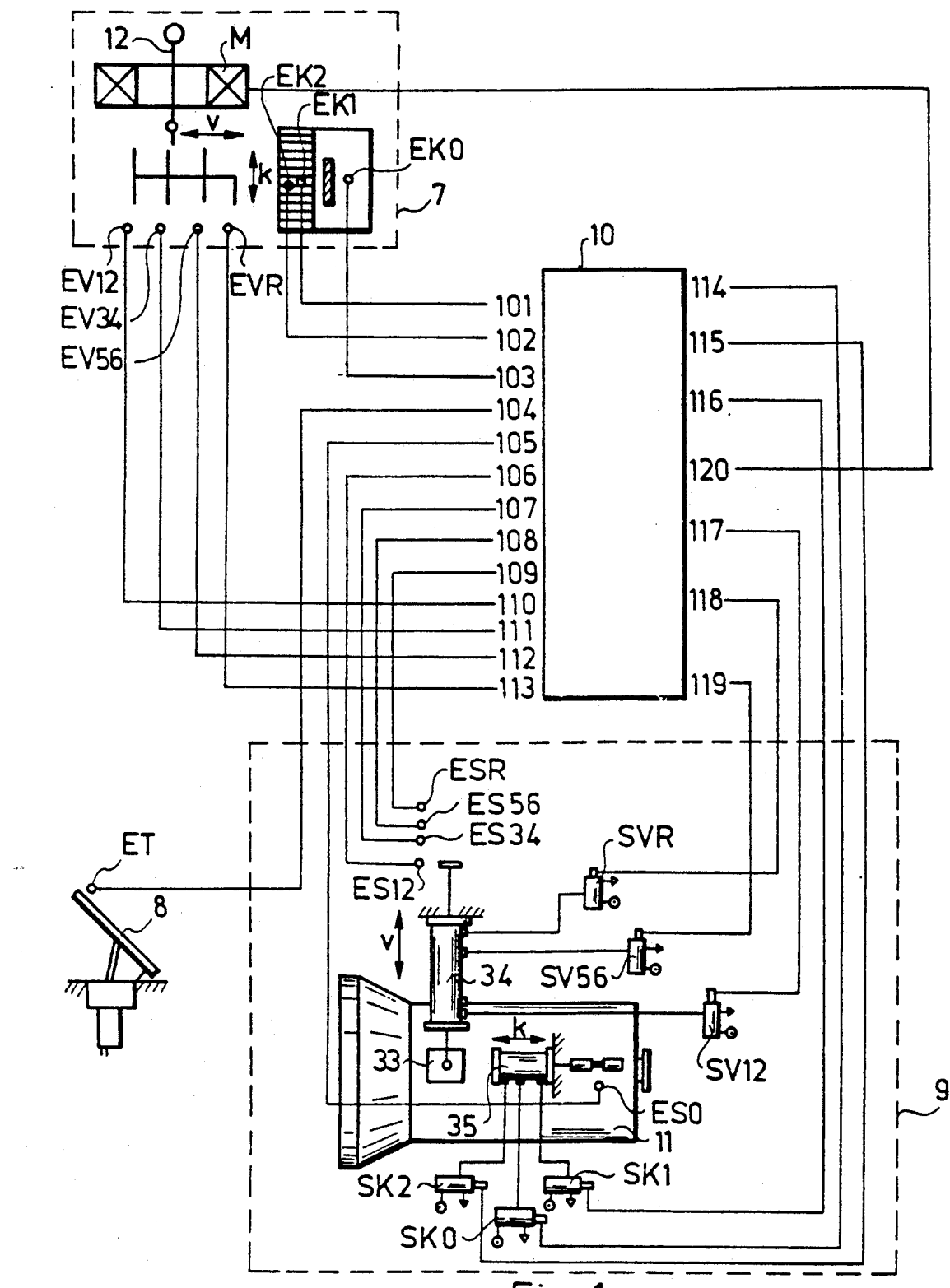
FIG. 1. is a schematic circuit arrangement of a control according to the invention.
Figure 2:
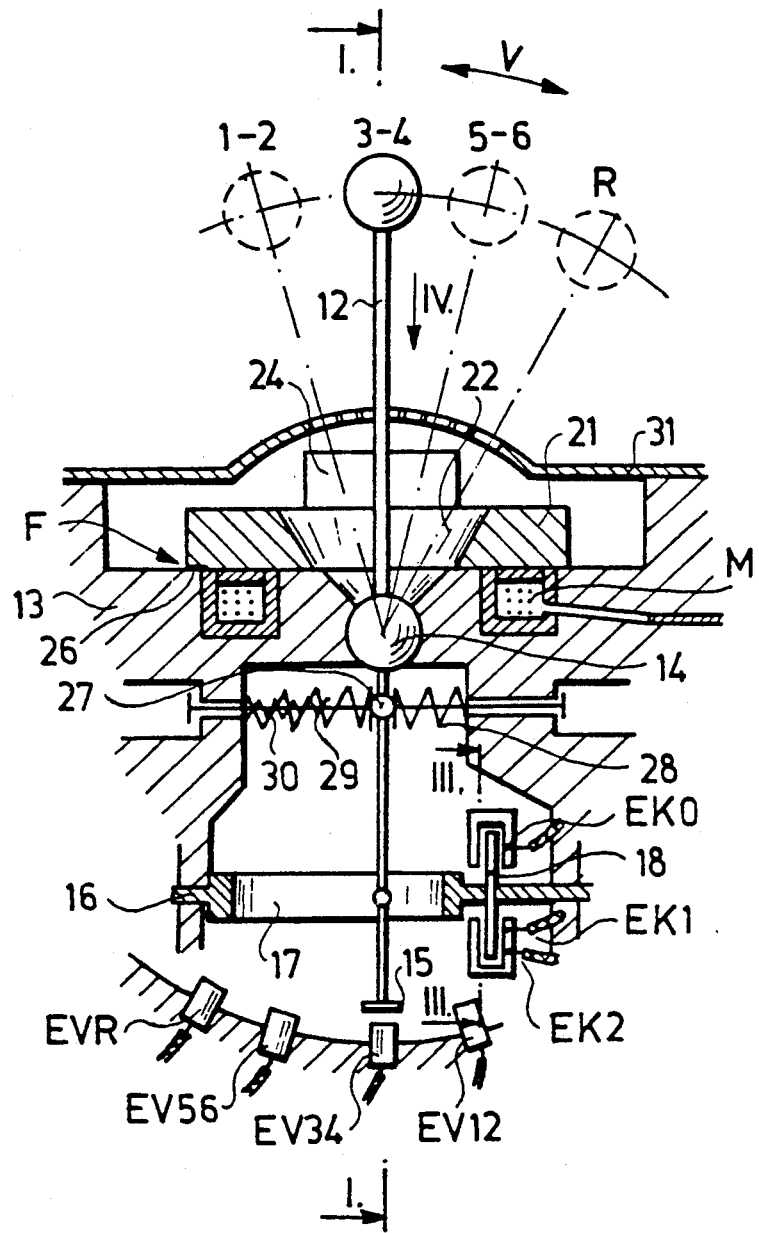
FIGS. 2 and 3 are fragmentary cross sectional views of one form of driver's control unit.
Figure 3:
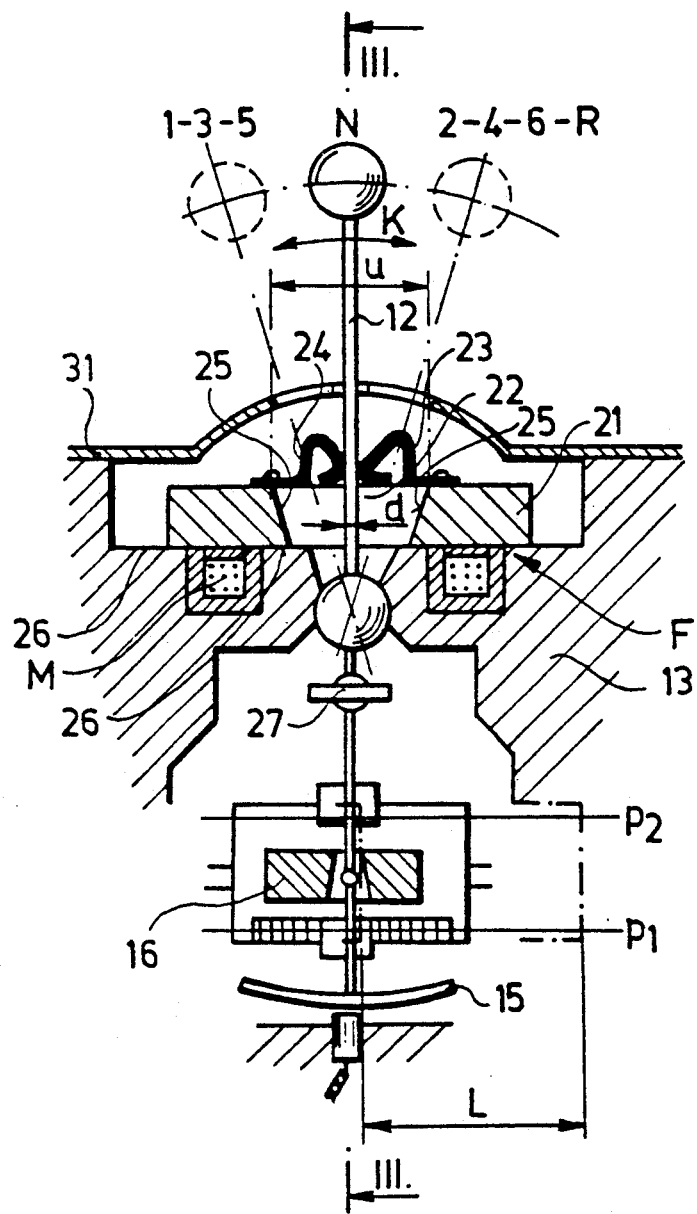

FIG. 1. illustrates the elements of a shift control for a synchronized mechanical transmission 11 having six forward and one reverse gear. A gear change unit 9 is built onto the transmission 11, and is connected through a control unit 10 with the shift control unit 7. As evident in FIG. 1, the control unit 10 is also connected to the clutch pedal 8. The role of said pedal will be detailed later. However, we should like to emphasize that this pedal is indispensable for our invention.

The shift control unit 7 will be detailed with reference to FIGS. 2 to 6.

Figure 4:
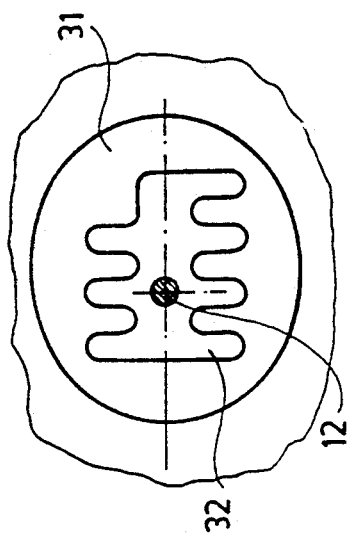
FIG. 4. is a shift diagram.

The lever 12 of the shift control—fulfilling the function of a normal gear change lever—can be manipulated by means of the ball and socket joint 14 in the housing 13 of the shift control unit in accordance with the circuit diagram of FIG. 4. This shifting arrangement 52 has the usual double H-shape, with the shifting paths $1-2^x$, $3-4^x$, $5-6^x$ and $R^x$. At both ends of the shifting path $1-2^x$ the position of the lever corresponds to the gear 1 and 2, while at the end of the shifting path $3-4^x$ the position of the shift lever corresponds to the gears 3 and 4. At the ends of the shifting path $5-6^x$ the position of the shift lever corresponds to the gears 5 and 6. In the shifting path $R^x$ the shift lever is positioned so as to correspond to the reverse gear. The neutral position N lies along the shifting path $3-4^x$.

Signal transmitters inform the control unit on the prevailing position of the shift lever 12. In the direction of selection v this is accomplished by the following elements: in the shifting path $1-2^x$ by the detector EV12; in the shifting path $3-4^x$ by the detector EV34; in the shifting path $5-6^x$ by the detector EV56; and in the shifting path $R^x$ by the detector EVR. These are arranged in the bottom part of the housing 13, in the plane of the motion of the shift lever 12 in the selecting direction v. Detectors EV12, EV34, EV56 and EVR are inductive detectors. The lower end of the shift lever 12 carries a curved plate 15, which is always covering one of the detectors, even if the shift lever is moving in the shifting direction k. Accordingly, in the selecting direction the detectors EV12, EV34, EV56 and EVR generate the signals needed together with the curved plate 15.

Display and signalling of the position of the shift lever 12 in the shifting direction k, represents a more complex task. Accordingly, the construction needed for realization is also more complicated.

In the housing 13, between the ball and socket joint 14 and the curved plate 15 a link 16 is guided so as to be displaceable only in the direction of shifting k. In the link 16 an opening 17 is formed, in which the shift lever 12 may move freely in the selecting direction v, but not in the shifting direction k.

Figure 5:
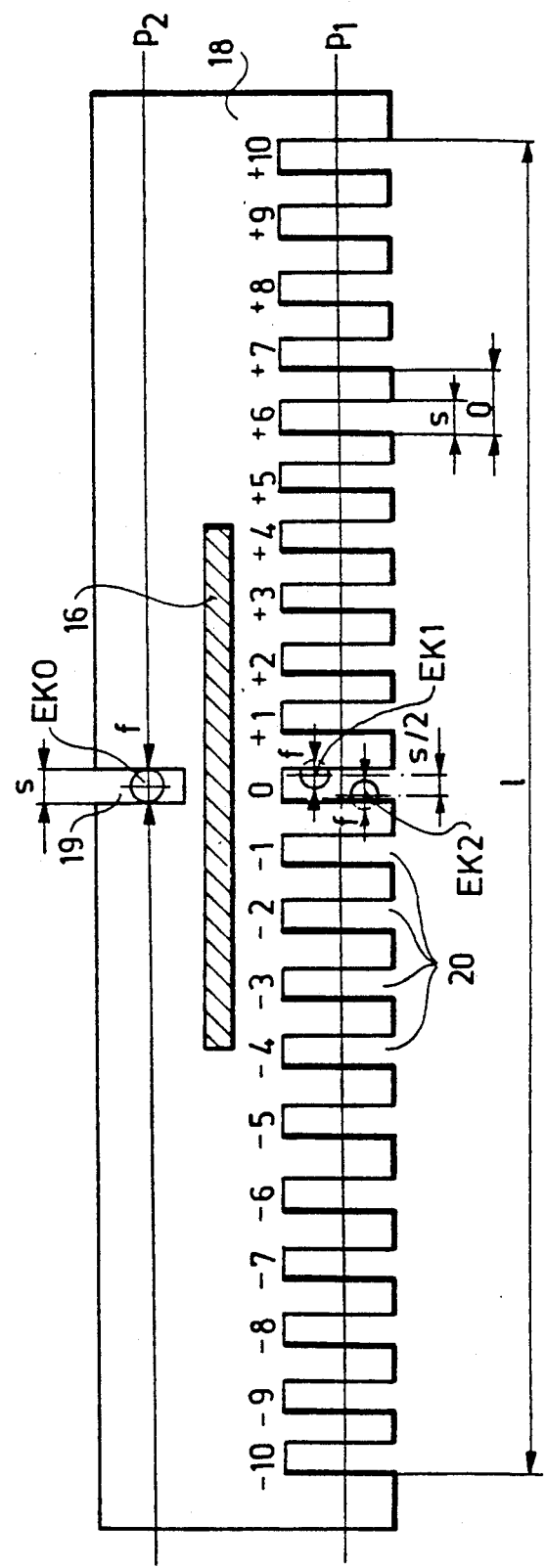
FIG. 5. is a fragmentary sectional view, taken along the line III-III of FIG. 2.

A signal transmitter element 18, which is illustrated in a larger scale in FIG. 5, is fixed to the link 16. The element 18 is a plate, the plane of which is arranged parallel with the direction of shifting k. Into one of the longitudinal edges of the element 18 twenty-one gaps 20 of identical width s are cut with a pitch of o. The pitch o amounts to the double of the width s. For the sake of better intelligibility said gaps 20 in FIG. 5 are numbered +1 to +10 to the right, starting from the central one with the number 0, and with −1 to −10 to the left. The length l of the part of the signal transmitter provided with the gaps 20 corresponds to the distance L between the two extreme positions of the transmitter element 18. On the other longitudinal edge of the signal transmitter element 18 there is a single gap 19 with the width s.

A plurality of detectors EK0, EK1 and EK2 (FIG. 2) serve for sensing the displacement of the element 18. These are detectors generating a signal upon light effect, known also as photo cells and the visual field f thereof corresponds to the width s of the gaps 19 and 20, respectively.

The detector EK0 is arranged in the path p2 of motion of the gap 19, while the detectors EK1 and EK2 are arranged along the path p1 of the motion of the gaps 20. In relation to one another the detectors EK1 and EK2 are displaced by the distance s/2 corresponding to the half of the gap width. The signal transmitter element 18 and the detectors EK0-EK2 form means for sensing motion in the direction of shifting k.

On the upper horizontal plane of the housing 13 there is a slide 21 made of ductile iron. In the direction of selection v an oblong gap 22 is formed in the slide, allowing the shift lever 12 to move unhindered in the direction of selection v. The lateral surfaces 25 of the gap 22 are separated by a distance u slightly larger than the dimension d of the shift lever 12.

On top of the slide 21, mounted parallel with the direction of selection v, are springs 23 and 24, each of the same size and bent from a wide sheet. The springs enclose the shift lever 12 and keep it in the central position in relation to the slide 21. The width of the springs 23 and 24 is selected so that they are able to enclose the shift lever 12 in any position in direction of selection v.

In the housing 13, below the slide 21, there is an annular electromagnet M arranged concentrically with the ball and socket joint 14 underneath the frictional surface 26. The electromagnet M and the slide 21 form together a braking-locking device F of the shift control unit.

In the direction of selection v, springs tend to maintain the shift lever in its neutral position N. On the shift lever 12, below the ball and socket joint, a block 27 is arranged with its longitudinal axis parallel with the direction of shifting k. Opposed coil springs 28, 29 are advanced under compression on opposite sides of the block 27. The outer ends of the springs bear against the housing 13. Within the coil spring 29, a shorter coil spring 30 is arranged. This is engaged by the block 27 only if the shift lever 12 is displaced to the path $5-6^x$ of shifting. The coil spring 30 also bears against the housing 13. This coil is far stronger than the coil springs 28 and 29, and serves to prevent accidental shifting into the reverse gear.

Figure 6:
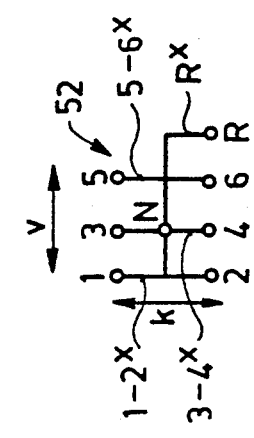
FIG. 6. is a top view of the control unit of FIG. 2, illustrating a shift guide.

The housing 13 is closed by a cover 31 on the top. As shown in FIG. 6, an opening 32, according to the circuit diagram 52 of FIG. 4, is formed in the cover.

The mode of construction of the gear change unit 9 is shown in FIG. 1. The gear change organ 33 of the transmission 11 is a pneumatically actuated selecting cylinder 34 and it in turn is connected to the piston rod of the shifting cylinder 35 which is also pneumatically actuated.

The selecting cylinder 34 is a four-position cylinder. Three of the four positions are established by pneumatics while the fourth position is the result of spring action. It is considered as superfluous to detail the selecting cylinder 34. Also, the four-position cylinder can be assembled of two two-position pneumatic cylinders, if desired.

Figure 7:
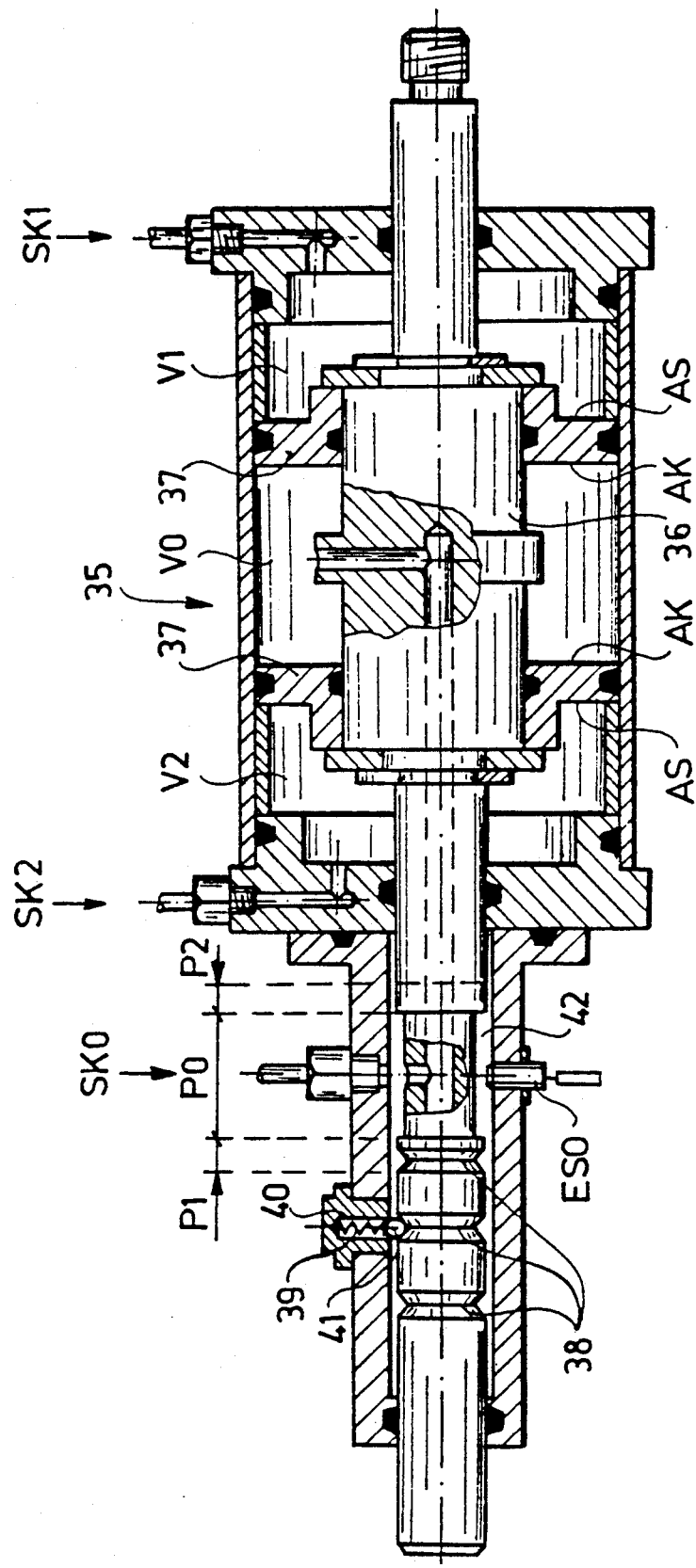
FIG. 7. is a longitudinal section of a possible embodiment of the shifting cylinder.
Figure 8:
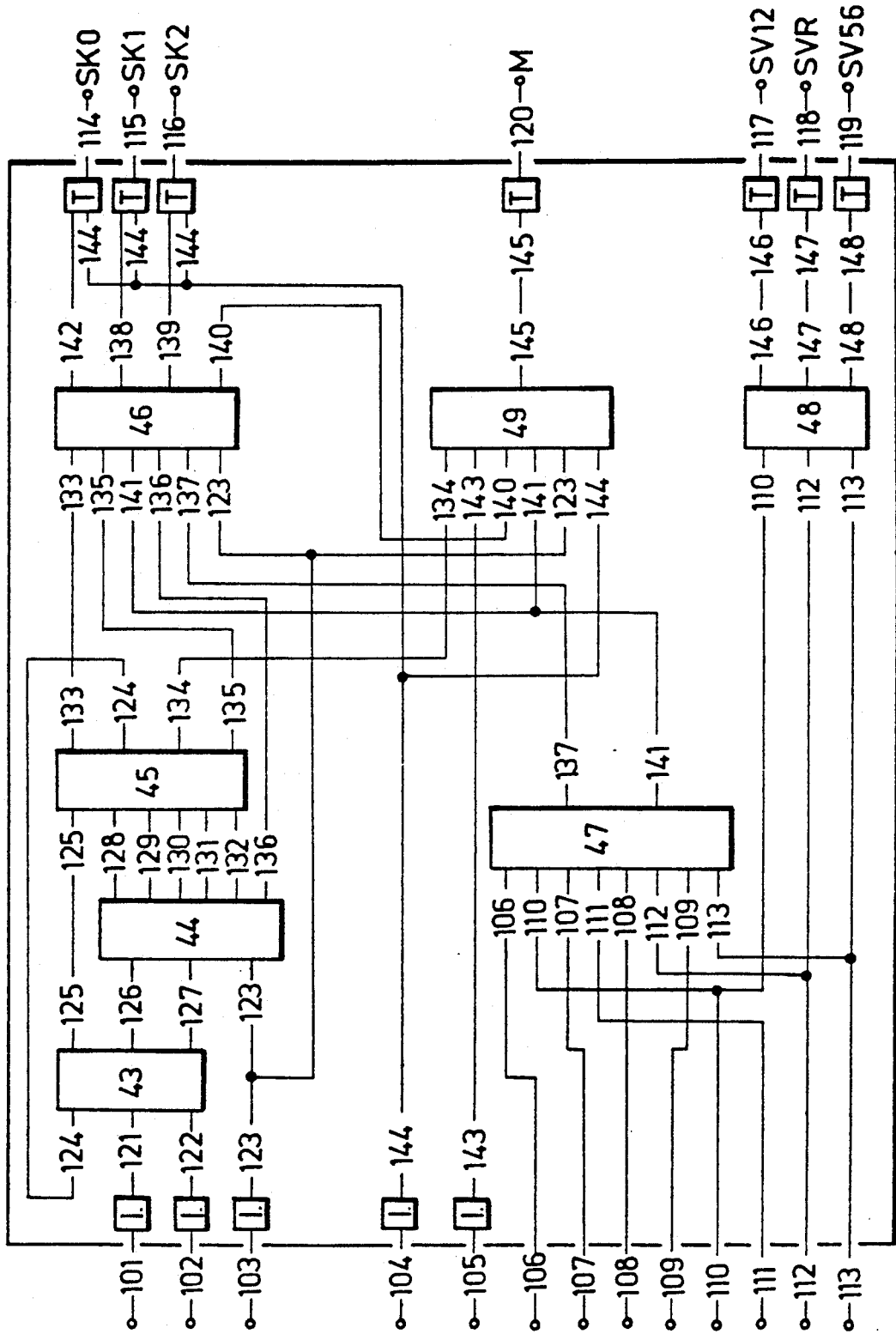
FIG. 8. is a schematic layout of a portion of the control unit.

The shifting cylinder 35, illustrated in FIG. 7, is a three-position cylinder. Two floating pistons 37 are arranged on an enlarged diameter portion of piston rod 36. As a consequence, the effective piston surface area AK facing the central cylinder space V0, is smaller than the effective piston surface area AS facing the outer cylinder spaces V1 and V2. Accordingly, as will be further described, the shifting cylinder 35 has two stages of compressive force in the extreme positions of the piston rod 36, depending on whether only the cylinder spaces V1 and V2, or the cylinder space V0, too, are connected to the source of pressurized air.

On the end of the piston rod 36, at locations corresponding to the three positions of the piston, annular grooves 38 are formed. A detent means 39, comprising a ball 41 loaded by the spring 40, engages said grooves.

Both the selecting cylinder 34 and the shifting cylinder 35 are connected to a source of pressurized air, not illustrated here. The selecting cylinder 34 is controlled by the valves SV12, SV56 and SVR, while the shifting cylinder is controlled by the valves SK0, SK1 and SK2. All of these valves are two-position three-way solenoid valves.

At the piston rod of the selecting cylinder 34 the detectors ES12, ES34, ES56 and ESR detect the momentary position of the gear changing element 33, while the detector ES0 fulfills the same task at the shifting cylinder 35. All of these are inductive detectors.

The position of the detector ES0 and the function thereof can be seen in FIG. 7. On the piston rod 36 there is a section P0, P1 and P2 serving as a signal transmitter sections. Section P0 is of reduced diameter, so the height of said section differs from the height to be measured in the sections P1, P2. In the central position of the piston rod 36 the section P0 is located opposite the detector ES0, while in the extreme positions the sections P1 or P2 are opposite the detector ES0. In such a manner it is possible to signal with a single detector ES0, whether the piston rod 36 is in its central position or one of its extreme positions.

The connection between the clutch pedal 8 and the device according to the invention is not imperative. However, the control unit to be described in the following is based on using said connection. A detector ET based on the principle of inductance is associated with the clutch pedal 8, and is arranged to give a signal upon pressing down the clutch pedal 8.

The control unit 10 is assembled of electronic elements. It should be mentioned that several versions can be imagined, and the embodiment to be specified here is but one example of the solution.

As indicated in FIG. 1, the input 101 of the control unit 10 is connected to the detector EK1, the input 102 to the detector EK2, and the input 103 to the detector EK0. The input 104 is connected to the clutch pedal detector ET. Inputs 105–108 are to the detector ES0, ES12, ES34 and ES56, respectively, and input 109 is connected to the detector ESR. Inputs 110–113 are connected to the detectors EV12, EV34, EV56 and EVR, respectively. Outputs 114–116 are connected to valve SK0, SK1, and SK2, respectively. Outputs 117–119 are connected to the valves SV12, SV56 and SVR, respectively. Output 120 is connected to the electromagnet M.

For the sake of better comprehensive view and to facilitate illustration single parts of the control unit 10 are illustrated as sub-units 43–49.

The sub-unit 43 functions to detect the direction of motion of the shift lever in the selecting direction. Its input 121 is connected to the input 101 through a matching stage I. Input 122 is connected to the input 102 through a matching stage I. Input 124 is connected to the output 124 of a sub-unit 45, which generates absolute values and performing comparisons. The output 125 is connected to the input of the sub-unit 45, and the outputs 125 and 127 are connected to the inputs 126 and 127 of a forward-backwards counting sub-unit 44.

In addition to the aforementioned inputs 126, 127 the forward-backwards counting sub-unit 44 has an input 123, which is connected to the input 103 through a matching stage I.

Outputs 128, 129, 130, 131 and 132 of the forwards-backwards counting sub-unit 44 are connected to the inputs of the sub-unit 45 (the inputs have identical reference numbers), while the output 136 is connected to the input 136 of a sub-unit 46 which controls output motion in the direction of shifting.

Outputs 133 and 135 of sub-unit 45 are connected to the similarly numbered inputs of the sub-unit 46, while the output 134 is connected to the identically numbered input of the sub-unit 49 controlling the electromagnet 49. Inputs 137 and 141 of the sub-unit 46 are connected to the identically numbered outputs of the sub-unit 47, which compares the positions of the shift lever and the cylinder 34, in the direction of selection. The input 123 is connected to the input 103 through the previously mentioned matching stage I. Outputs 142, 138 and 139 are connected to the output 114, 115 and 116, respectively, via power amplifier T. The output 140 is connected to the identically numbered input of the sub-unit 49 controlling the electromagnet. The power amplifiers T connecting outputs 114–116 are connected with an input 144 each to the input 104 through the matching stage I.

Inputs 106, 110, 107, 111, 108, 112, 109 and 113 of the sub-unit 47 are connected to the identically numbered inputs of the control unit 10. The output 141, in addition to being connected to the sub-unit 46, is also connected to the identically numbered input of the sub-unit 49 controlling the electromagnet.

Inputs 110, 112 and 113 of the sub-unit 48, controlling output motion in direction of selection, are connected to the identically numbered inputs of the control unit 10, while the output 146–148 are connected to the output 117–119, respectively, through power amplifiers T.

For the sub-unit 49 controlling the electromagnet input 143 is connected to the input 105 through the matching stage I, the input 123 to the input 103 via the matching stage I, while the input 144 is connected to the input 104 through the matching stage I. The only output 145 is connected to the output 120 through the power amplifier T.

Within the sub-unit 49, due to the their special function, two small parts can be further separated, namely the block 50 (FIG. 15) delaying the shifting of the electromagnet and the block 51 timing the release of the electromagnet.

Circuit diagrams of the aforementioned sub-units may be seen in FIG. 9 to 15. In the course of realization of the control unit 10, actually several electronic elements were used, which contained a plurality of operative units. As a matter of fact the control unit 10 was not built-up by assembling the sub-units as such. Indeed, certain electronic elements can be found with their operative units each in one or more of the sub-units which have been delimited arbitrarily by us for the purpose of facilitating understanding.

In course of actual realization, the control unit 10 was assembled of the following elements, using the denominations of the IC-Catalog of the Technical Publishers: an IC1 Schmidt-trigger (CD-40106), an IC2 XOR gate containing four operational units IC2/1–IC2/4 (4030), an IC3 NAND gate (4011) containing four operational units IC3/1–IC3/4, a bistable circuit (flip-flop) of the type IC4D (4013) containing operational units IC4-/1–IC4/2, a forward-backwards counting unit IC5 and IC6 (4029), an XOR gate IC7 (4030) containing four operational units IC7/1–IC7/4, four-bit digital comparators IC8 and IC9 each (74C85), and IC10 inverter (4069) containing six operational units IC10/1–IC10/6, AND gates IC11, IC12 and IC13 containing four operational units each IC11/1–IC11/4, IC12/1–IC12/4, IC13/1–IC13/4 (4081), a driver stage IC14 (4050) containing six operational units IC14/1–IC14/6 and an OR gate IC15 (4071) containing four operational units IC15-/1–IC15/4. In the course of assembly we applied resistors R1–R7, condensers C1–C8 and diodes D1–D8 (4148) as well.

In the following we detail the arrangement of the individual sub-units with reference to FIG. 9 to 15.

Figure 9:
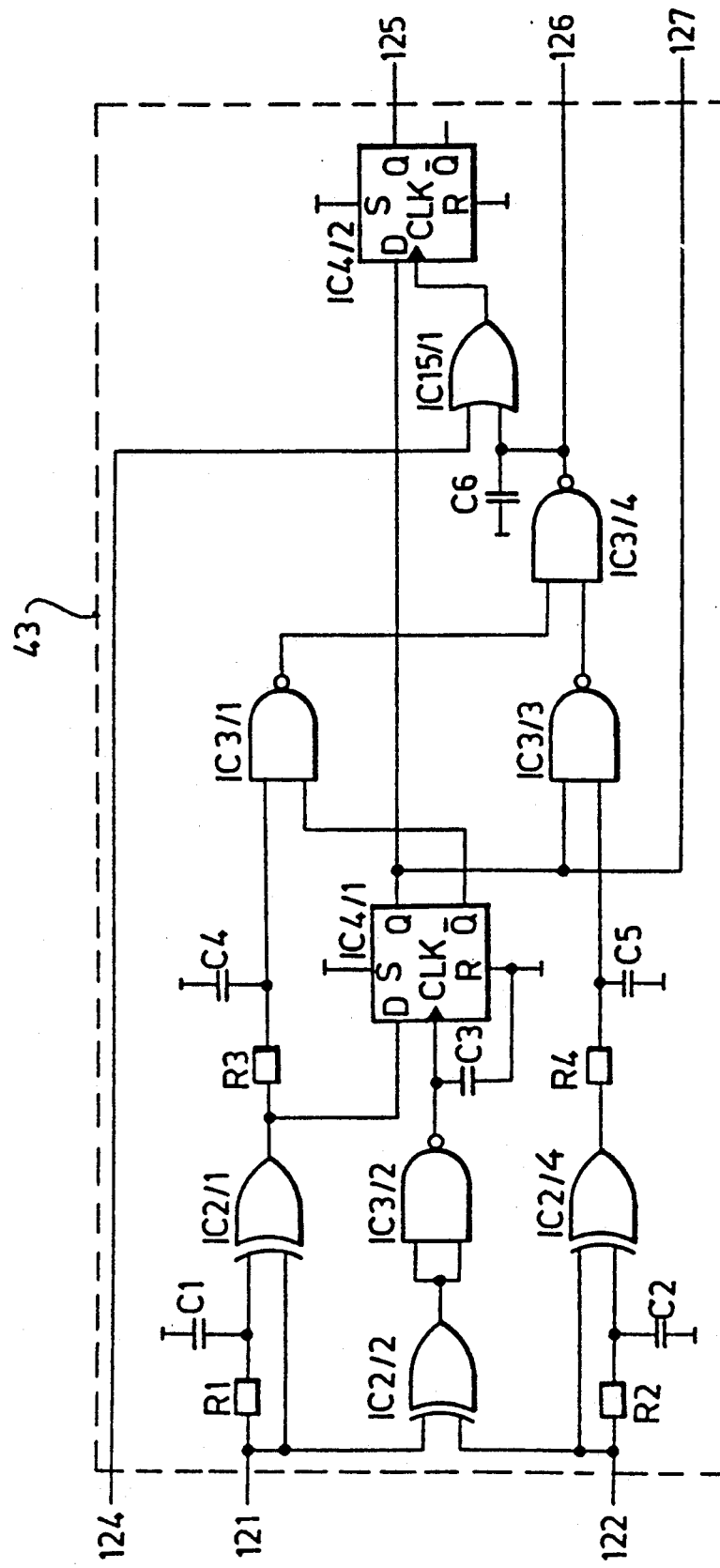
FIG. 9. is the schematic of the control sub-unit for detecting the direction of control lever movement.

Referring now to FIG. 9, the input 121 of the direction sensing unit 43 is connected directly to one of the inputs of the XOR unit IC2/1, while it is connected to the other input through a resistor R1. The common point of the resistor R1 and the XOR unit IC2/1 is connected to ground through a condenser C1. The input 121 is also connected directly to one of the inputs of a second XOR unit IC2/3.

The input 122 is connected directly to one of the inputs of the XOR unit IC2/4, while the other input is connected through the resistor R2. The common point of the resistor R2 and the operational unit IC2/4 is also connected to ground through the condenser C2. The input 122 is connected directly to the other input of the XOR unit IC2/3.

The output of the first XOR unit IC2/1 is connected to one of the inputs of the NAND gate IC3/1 through the resistor R3. The common point of the resistor R3 and the input of the NAND gate IC3/1 is connected to ground through a condenser C4. The output of the XOR unit IC2/1 is also connected directly to the data signal input D of the flip-flop unit IC4/1.

The output of the second XOR unit IC2/3 is connected to both inputs of the NAND gate IC3/2, while the output of the NAND gate IC3/2 is connected directly to the clock signal input CLK of the flip-flop unit IC4/1, with the insertion of a condenser C3 to the reset input R and to ground.

The set input S of the flip-flop unit IC4/1 is connected to ground, the output Q is connected to the data signal input D of a second flip-flop unit IC4/2 and to the input of NAND gate unit IC3/3, while the output $\overline{Q}$ is connected to the other input of the NAND gate IC3/1. The output Q represents simultaneously the sub-unit output 127.

The output of the third XOR unit IC2/4 is connected to the other input of the NAND gate IC3/3 through the resistor R4. The common point of the resistor R4 and the NAND gate IC3/3 is connected to ground through the condenser C5.

The outputs of NAND gates IC3/1 and IC3/2 are connected to the inputs of a further NAND gate IC3/4. The output of the NAND gate IC3/4 represents partly the sub-unit output 126, and partly it is connected to one of the inputs of the OR gate IC15/1. The output of the NAND gate IC3/4 and the input of the OR gate IC15/1 are connected with their common point to ground through the condenser C6.

The other input of the OR gate IC15/1 is connected to the sub-unit input 124, while the output is connected to the clock signal input CLK of the flip-flop unit IC4/2. The set input S of the flip-flop unit IC4/2 and the reset input R thereof are connected to ground. The output Q yields the sub-unit output 125, the output $\overline{Q}$ is left free.

Figure 10:
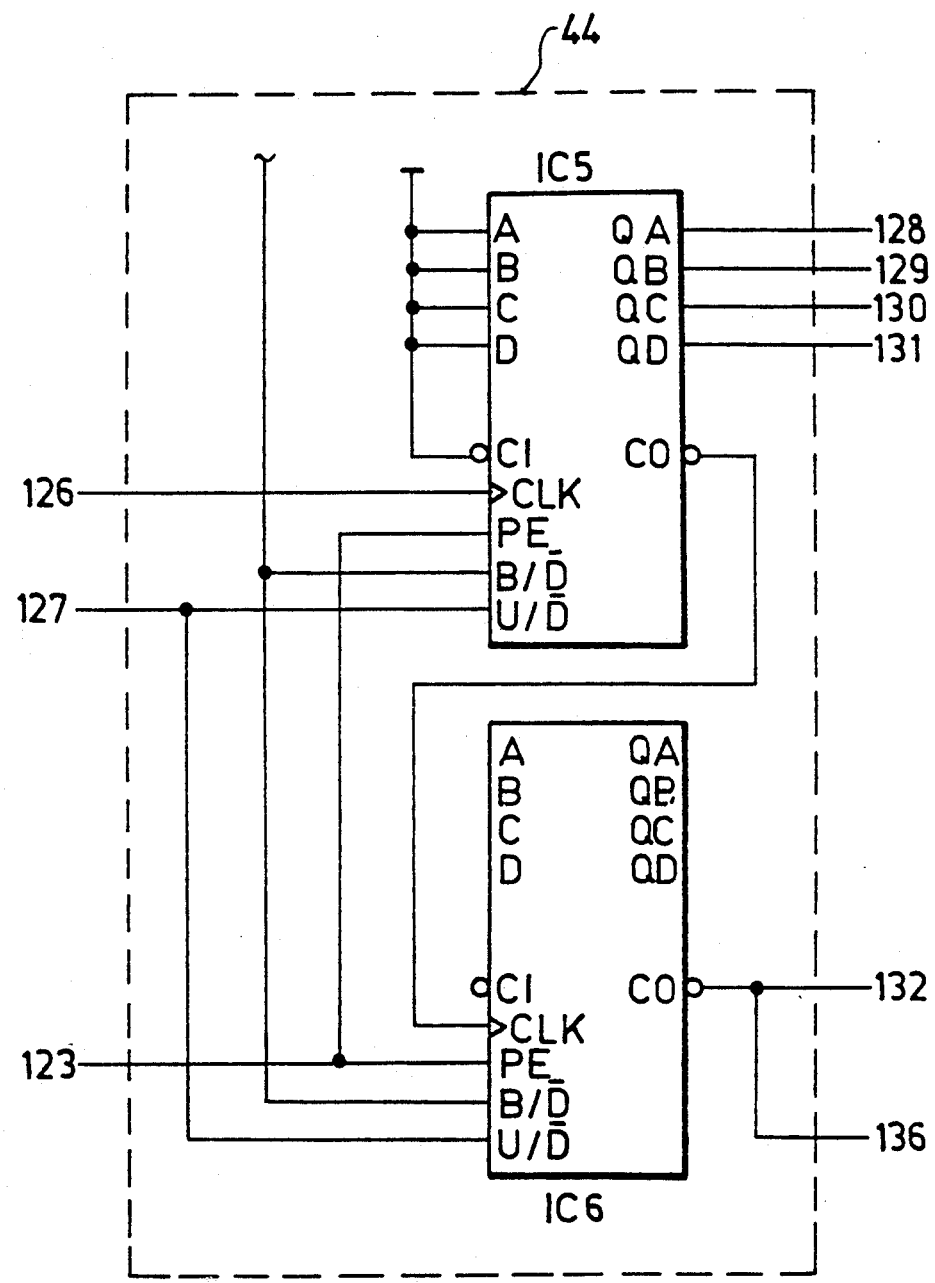
FIG. 10. is a circuit diagram of a forward-backward counting sub-unit.

As indicated in FIG. 10, the forward-backwards counting sub-unit 44 consists of the forward-backwards counters IC5 and IC6 respectively. The inputs A, B, C and D of the counter IC5 as well as the permitting input CI are all connected to ground. The clock signal input CLK is connected to the input 126, the inhibiting input PE to the input 123, the binary-decimal input B/$\overline{D}$ to the supply voltage, while the up/down input U/$\overline{D}$ is connected to the input 127. The outputs QA, QB, QC, QD are simultaneously the outputs 128, 129, 130, 131, respectively, while the output C0 yielding the signal of the final value is connected to the clock signal input CLK of the second stage counter IC6. Beside the aforementioned clock signal input, input signal sources are connected only to the inhibiting input PE, to the input of the binary/decimal counter B/$\overline{D}$, and to the input of the up/down counter U/$\overline{D}$. The C0 output, yielding the signal of the final value, is the only utilized output of the counter IC6 representing also the outputs 132 and 136.

Figure 11:
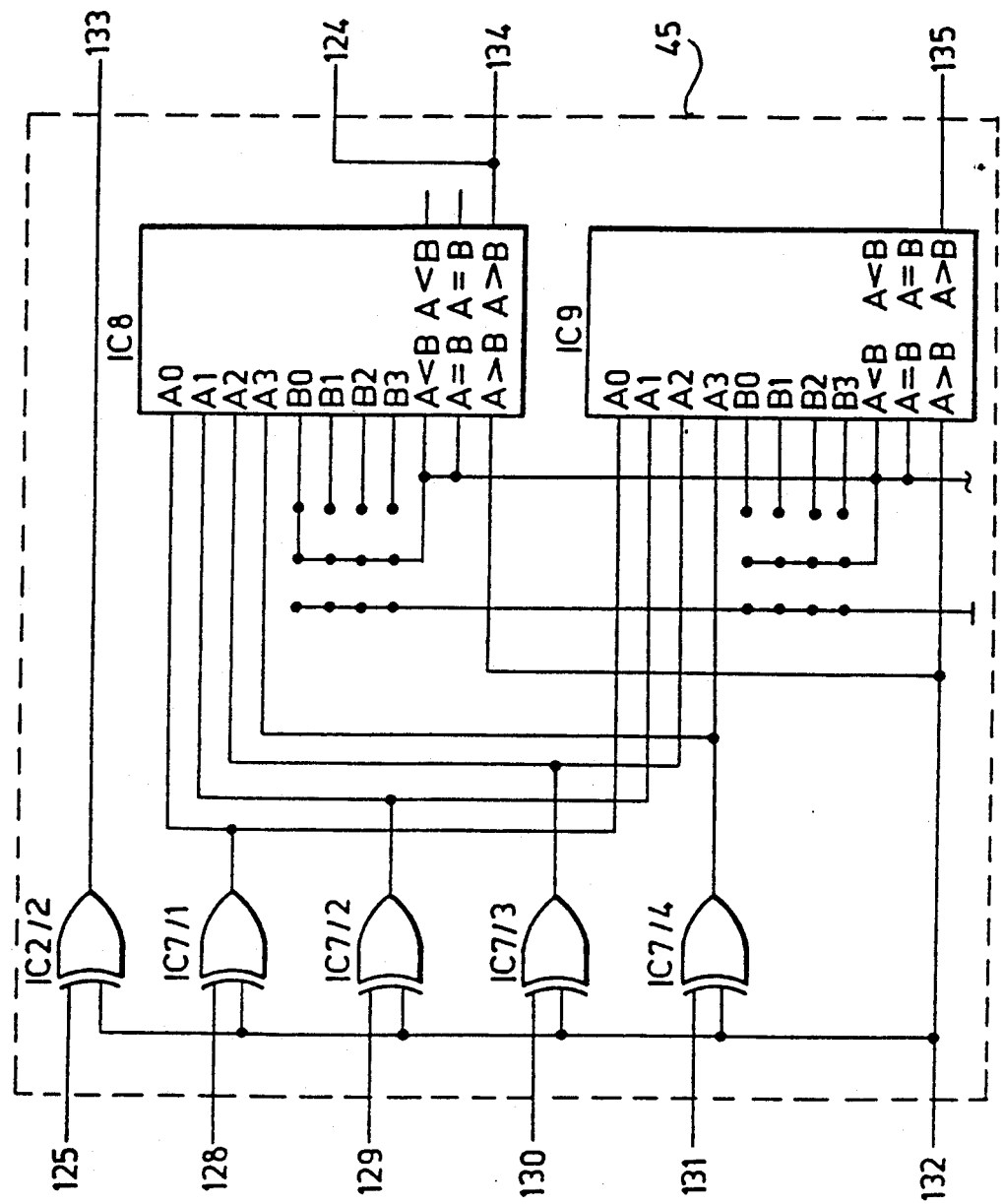
FIG. 11. is a circuit diagram of the sub-units producing an absolute value and a comparative value.

As shown in FIG. 11, in the sub-unit 45, for producing and comparing the absolute value, the input 125 is connected to one of the inputs of the XOR unit IC2/2 The input 128–131, respectively, are connected to one of the inputs of each of the XOR units IC7/1–IC7/4. The other inputs of the XOR units IC2/2, IC7/4, IC7/1, IC7/2 and IC7/3 are connected to the input 132.

The XOR unit IC2/2 gives the sub-unit output 133.

The output of the XOR unit IC7/1 is connected to the inputs A0 of each of the digital comparators IC8 and IC9. The output of the XOR unit IC7/2 is connected to the inputs A1, the output of the XOR unit IC7/3 is connected to the inputs A2 and the output of the XOR unit IC7/4 is connected to the inputs A3.

The inputs B0, B1, B2, B3 of the digital comparators IC8 and IC9 are basic-signal inputs. The inputs A<B and A=B are connected to the supply voltage, while the inputs A>B are connected to the input 132. The output A>B of the digital comparator IC8 represents the outputs 124, 134, while the output A>B of comparator IC9 is simultaneously the output 135.

Figure 12:
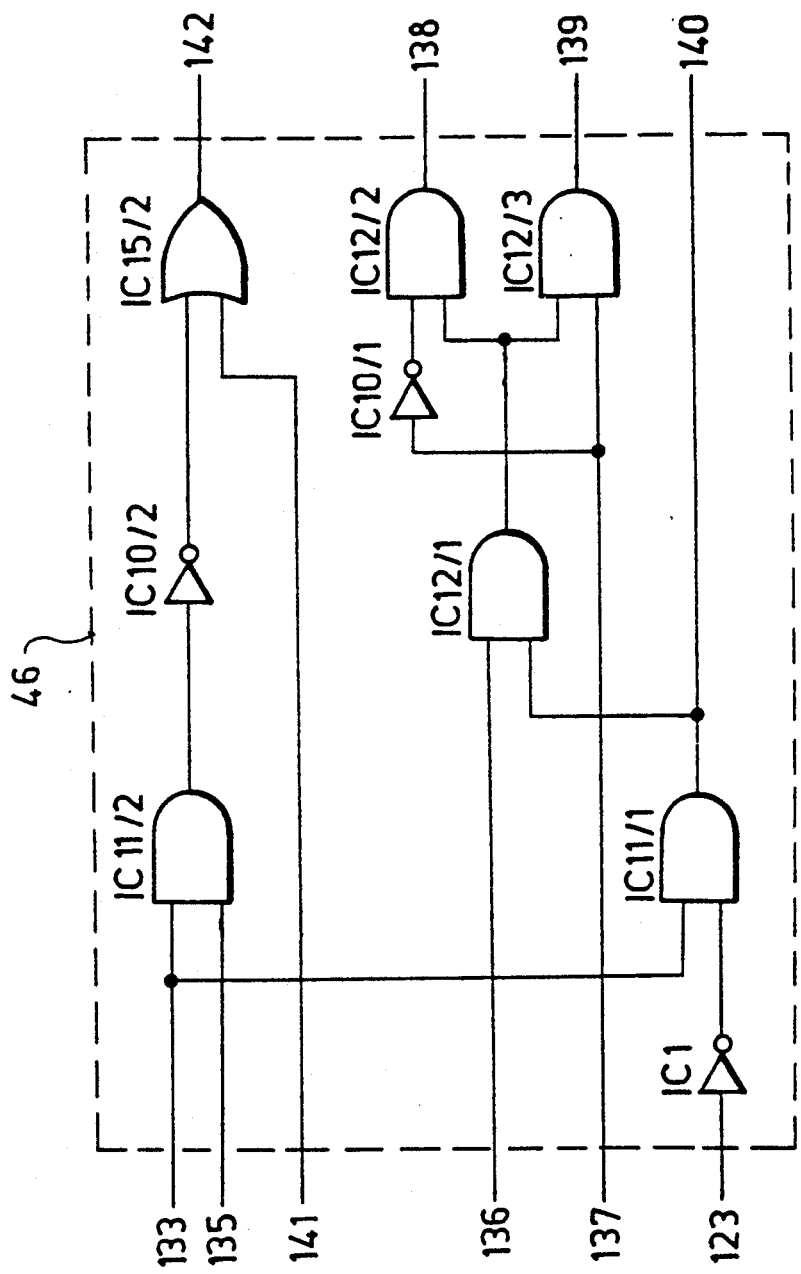
FIG. 12. is a circuit diagram of the sub-unit controlling output motion in the shifting direction.

As evident in FIG. 12, in the sub-unit 46 controlling the output motion in the direction of shifting, the input 133 is connected to one input of the AND gates IC11/2 and IC11/1, respectively. The other input of the AND gate IC11/2 is connected to the input 135, while the output is connected through an invertor IC10/2 to one of the inputs of an OR gate IC15/2. The other input of the OR gate IC15/2 is connected to the input 141, and the output thereof constitutes the sub-unit output 142.

The other input of the AND gate IC11/1 is connected to the sub-unit input 123 with the insertion of a Schmidt-trigger IC1. The output of the AND gate IC11/1 is connected partly to one of the inputs of an AND gate IC12/1, and partly it constitutes the sub-unit output 140. The other input of the operational unit IC12/1 is connected to the sub-unit input 136, while the output thereof is connected to an input of each of two AND gates IC12/2 and IC12/3, respectively. The other input of the AND gate IC12/3 is connected directly to the sub-unit input 137, while the other input of the AND gate IC12/2 is connected through an invertor IC10/1 to the sub-unit input 137. The output of the AND gate IC12/2 is the sub-unit output 138, while the output of the operational unit IC12/3 represents the sub-unit output 139.

Figure 13:
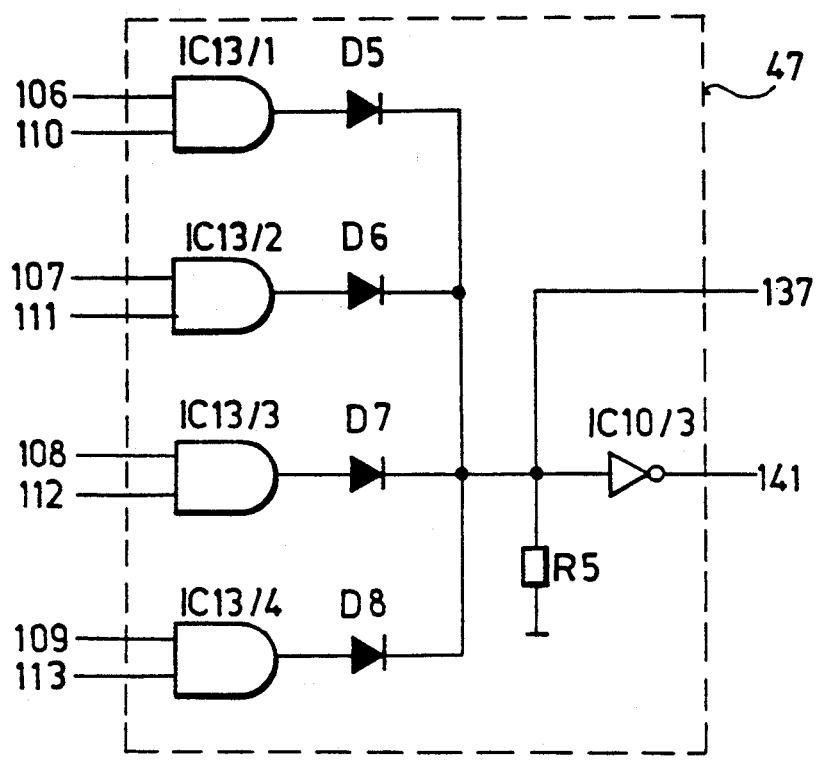
FIG. 13. is a circuit diagram of the comparative sub-unit comparing the position in the selecting direction.

As shown in FIG. 13, input pairs 106, 110, 107 and 111, 108 and 112, and 109 and 113 of the sub-unit 47 are connected to the inputs of AND gates IC13/1–IC13/4, respectively. The outputs of these AND gates are connected through diodes D5–D8 with one another as well as directly to the sub-unit output 137. They are also connected to the sub-unit output 141 through an invertor IC10/3 and through the resistor R5 to ground.

Figure 14:
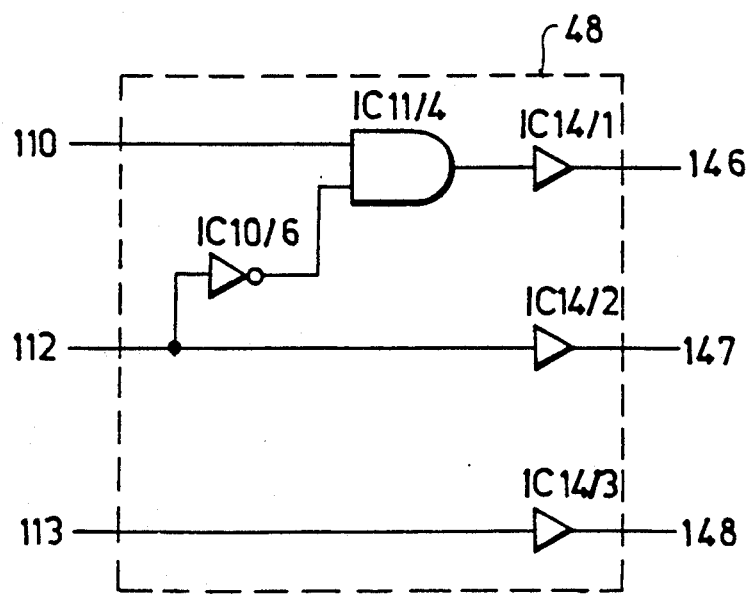
FIG. 14. is a circuit diagram of the sub-unit controlling the output motion in the selecting direction.

As shown in FIG. 14, the input 110 of the sub-unit 48, controlling output motion in the direction of selection, is connected to one of the inputs of an AND gate IC11/4, the input 112 is connected partly to the other input of the AND gate IC11/4 through an invertor IC10/6, and partly to the sub-unit output 147 through the operational unit IC14/2, and the input 113 thereof is connected to the sub-unit output 148 via the operational unit IC11/3. The output of the operational unit IC11/4 is the sub-unit output 146 through the operational unit IC14/1.

Figure 15:
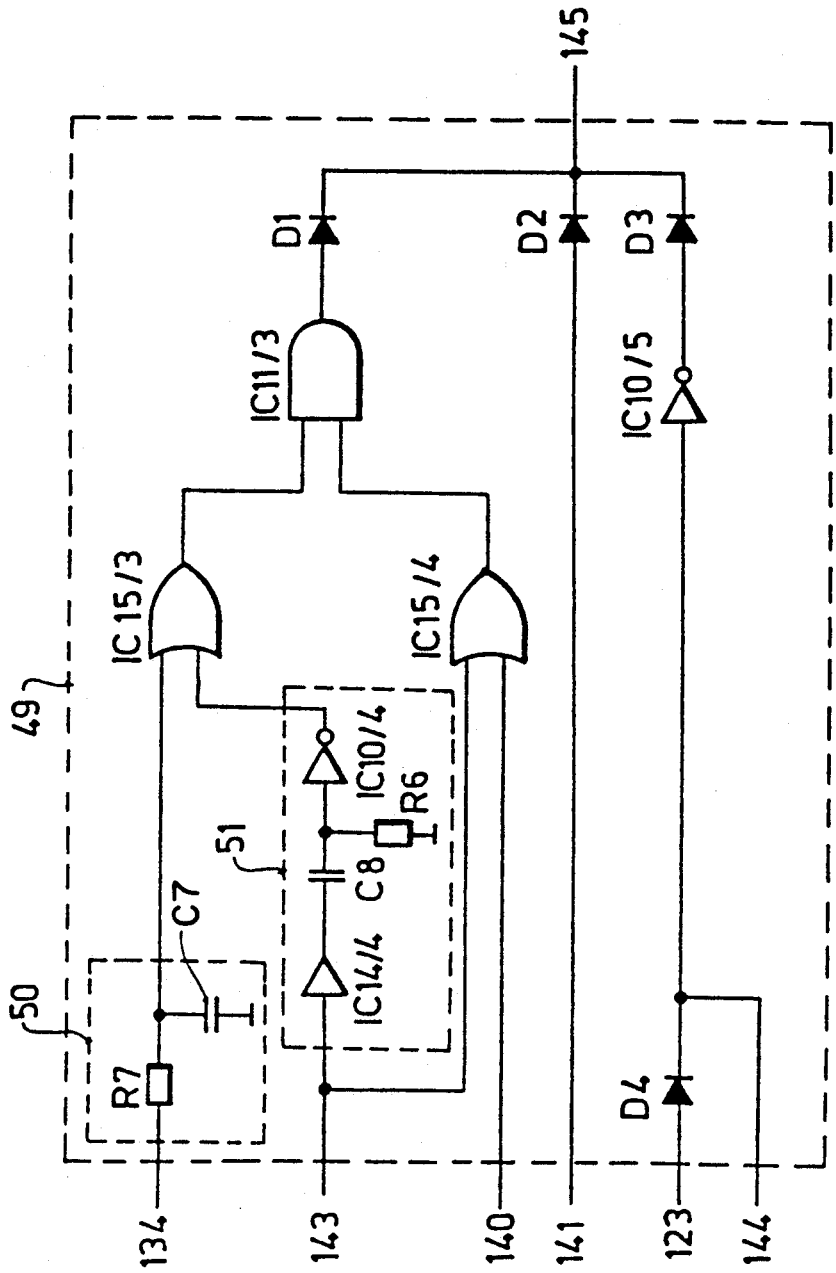
FIG. 15. is a circuit diagram of the sub-unit for controlling an electromagnetic lever brake.

As is evident from FIG. 15, the sub-unit 49, controlling the electromagnet, comprises a first block 50, delaying the shifting of the electromagnet, and a second block 51, timing the release of the electromagnet. The input 134 is connected through a resistor R7, partly to one of the inputs of an OR gate IC15/3, and partly to ground through the condenser C7. The resistor R7 and the condenser C7 form the block delaying the switching of the electromagnet.

The input sub-unit 143 is connected partly to one of the inputs of an OR gate IC15/4, and partly it is connected to the other input of the OR gate IC15/3, through the operational unit IC14/4, condenser C8 and invertor IC10/4. The block 51 timing the release of the electromagnet consists of the operational unit IC14/4, the condenser C8, the invertor IC10/4 as well as the resistor R6 interconnecting the common point of the latter ones ground.

The sub-unit input 140 is connected to the other input of the OR gate IC15/4. The outputs of the OR gates IC15/3 and IC15/4 are connected to separate inputs of an AND gate IC11/3. The output of the AND gate IC11/3 is connected to the sub-unit output 145 via a diode D1. The output 145 is also connected to the input 141 through a diode D2. The input 123 is connected to the input of an invertor IC10/5 through a diode D4, while the sub-unit input 144 is connected directly thereto. The output of the invertor IC10/5 is connected also to the output 145 through a diode D3.

Neither the matching stages I, nor the power amplifiers T have to fulfil any task directed to control. They do not form the part of the invention, and are not described further herein.

The shift control arrangement as described, operates as follows:

When the voltage supply of the shift control means is off, the gear remains in its shifted state. Additionally, the shift lever 12 also remains in the position corresponding to the momentary gear condition. Accordingly, the shift control device is connected to the electric network so that it will receive voltage prior to starting of the motor, so that it may be first shifted into neutral, if desired. For the sake of simplicity let us start from the neutral position N of the shift lever 12. That means that the shifting cylinder 35 occupies its central position and the selecting cylinder 34 is at the shifting path 3-4$^x$, thereafter the motor can be started.

After having started the motor, in the same way as with traditional motor vehicles, the driver releases the clutch by means of the clutch pedal 8. Pressing down of the clutch pedal 8 is sensed by the detector ET and it forwards a signal to the input 104 of the control unit 10. Upon the effect of the signal arriving at the input 104 the signal appears also on the output 144, which arrives at the power amplifier T provided with the input 144 and at the input 144 of the sub-unit 49 controlling the electromagnet.

Power amplifiers T apply the voltage onto the electromagnets of the solenoids valves SK0, SK1, SK2 through the outputs 114, 115, 116. As a consequence, all three solenoid valves SK0, SK1, SK2 are opened and pressurized air is allowed to stream into the cylinder spaces V0, V1, and V2 of the shifting cylinder 35. As all cylinder spaces are pressurized, the forces acting on the pistons 37 are in the state of equilibrium and the piston rod 36 cannot be displaced.

When the signal arrives at the input 144 of the sub-unit 49 controlling the electromagnet, no signal will be released yet. This signal represents only a permitting signal.

In order to be able to put the motor vehicle in motion the driver has to change to low gear. For this purpose the driver displaces the shift lever 12 in the selecting direction v, over to the shifting path 1-2$^x$. Now the support 15 on the end of the shift lever 12 will lie above the detector EV12, which forwards a signal to the input 110 of the control unit 10. Therefrom the signal is led to the input of the sub-unit 48 controlling the out motion in selecting direction and to the input of the position feedback sub-unit 47.

The sub-unit 48 controlling output motion in the selecting direction gives a signal on its output 146 to the power amplifier T, which again applies voltage to the electromagnet of the valves SV12 through the output 117. The valve SV12 admits pressurized air into the proper cylinder space of the selecting cylinder 34. As a consequence the gear change organ 33 is shifted in the selecting direction v to the shifting path 1-2$^x$. Arrival at the selected position is sensed by the detector ES12 and a signal is forwarded to the input 106 of the control unit 10.

The feedback signal arriving at the input 106 is compared with the control signal arriving at the input position 110 in the feedback sub-unit 47. If the two signals are identical, i.e., if the shift lever 12 and the gear change organ 33 are positioned at identical shifting paths 1-2$^x$, the sub-unit 47 generates a signal on its outputs 137 and 141, respectively for the sub-unit 46 controlling output motion in the shifting direction. The signal generated on the output is in part directed to 141 the sub-unit 49 and used for controlling the electromagnet M. Upon the signals arriving at both of the inputs 144 and 141 of the magnet sub-unit 49 a signal is forwarded to the power amplifier T, which deactivates the electromagnet M. This allows the slide 21 to move. Accordingly, the shift lever can now be shifted in the shifting direction k. Thereafter, the driver starts the shift lever 12 along the shifting path 1-2$^x$ to the position 1 corresponding to the bottom gear.

Upon shifting of the shift lever 12, the signal transmitter plate 18 is also moved. Upon starting into motion the gap 19 moves away from its position in front of the detector EK0, which thereupon forwards a signal to the input 103 of the control unit 10. Accordingly, the detector EK0 detects that the signal transmitter plate 18 has been moved from its central position.

Simultaneously with the displacement of the plate 18 the gaps 20 are also displaced. If the central gap 20 with the number 0 first leaves one of the detectors EK2 or EK1, and thereafter the other. The detector EK2 forwards a signal to the input 102 and the detector EK1 to the input 101 of the control unit 10. The signals of both of the detectors EK2 and EK1 arrive at inputs 121, 122 the sub-unit 43 through the proper matching stage I. The sub-unit 43 detects the direction of displacement of the shift lever 12 in the shifting direction k by determining that the signal of the detector EK2 arrived ahead of the signal of the detector EK1, or vice versa.

The signal released by the centering detector EK0 and arriving at the input 103 is led through the matching stage I to the forward-backwards counting sub-unit 44 activating the sub-unit 44 for starting the counting of the pulses. Pulses to be counted from the signals of the detectors EK2 and EK1 are forwarded through the direction sensing sub-unit 43 to the forward-backwards counting unit 44, which forwards the momentary result of counting into the sub-unit 45. In the sub-unit 45 the result of counting is compared with the pre-programmed values.

As soon as the gap 20 with the serial number 0 leave the detectors EK2 and EK1, respectively, the direction detector 43 determines the direction of displacement. This information is led in the form of a signal to the sub-unit 45 which forwards the signal to the sub-unit 46 controlling output motion in the shifting direction. In the illustrated example (shifting to "low" gear) this removes voltage from the electromagnet of the solenoid valve SK2 by the signal given to the power amplifier T. As a consequence, the valve SK2 empties the left side cylinder space V2 of the shifting cylinder 35.

As soon as the cylinder space V2 is discharged, the equilibrium of forces ceases in the shifting cylinder 35 and the piston rod 36 moves towards the cylinder space V2 and displaces the gear changing element 33 in the direction of shifting k, to the position 1 corresponding to the bottom gear with a force which corresponds to the difference between the active piston surface AS and the active piston face AK. With this relatively lower level of force, synchronization of the bottom gear is started.

Simultaneously with starting the process of synchronization the sub-unit 45 forwards a signal into the sub-unit 49 controlling the electromagnet. The sub-unit 49, with a delay having been set by the block 50, applies voltage onto the electromagnet M. As a consequence, the magnet fixes the slide 21. Now the shift lever 12 comes to a sudden stop and so that the gap 20 of the signal plate with the series number +2 is before the detectors EK2, EK1. Stopping of the shift lever 12 informs the driver of the fact that synchronization of the bottom gear is taking place.

Even though the slide 21 is stopped the shift lever 12 can be pushed somewhat further against the spring 24. Now the driver allows the shift lever 12 to impact on the impact surface 25 of the slide 21, and the gap with the series number +4 arrives before the detectors EK2, EK1. Now the absolute value sub-unit 45 forwards a newer signal to the output sub-unit 46 which applies voltage to the solenoid valve SK0. Thereafter the valve SK0 empties the central cylinder space V0 of the shifting cylinder 35. As a consequence, the piston rod 36 will work at a higher level of force.

While the lower force is set for synchronization, the higher force level 25 calculated for the actual shifting of the gear. So, by means of the gear shift element 33 the piston rod 36 finishes the change to the bottom gear. As soon as the piston rod 36 reaches its extreme position, the ball 41 of the detent means springs into the groove 38 in the piston rod 36.

Switching of the bottom gear is sensed by the detector ES0. By this time the recess 42 in the piston rod 36 is leaving the detector ES0 and the section P2 approaches the detector ES0. The signal of the detector ES0 is led first to the input 105 of the control unit 10. It is then forwarded through the matching stage I to the sub-unit 49 controlling the electromagnet. Upon the signal being received the sub-unit 49 blocks the voltage from the electromagnet M. As a consequence, the electromagnet M frees the slide 21 and the shift lever 12 can be pushed forward. The block 50 (FIG. 15) delays the release of the electromagnet. However, in this case it has no significance.

Now the driver shifts the shift lever 12 to the end of the shifting path 1-2$^x$. The shift lever 12 impacts on the cover 31. In this position of the shift lever 12 the gap with the series number +10 arrives at the detectors EK2, EK1. Now, the absolute values sub-unit 45 again forwards a signal to the magnet sub-unit 49 which, with a delay set by the block 50, applies voltage to the electromagnet M so the slide 21 will again be fixed.

The delay was needed for allowing the spring 24 to return into its basic position. This becomes possible so that when the shift lever 12 impacts on the cover 31, the slide is still able to slide forward. That means that the spring 24 pushes the slide 21 away from the shift lever 12, which already is in its limit position. If this did not happen, the spring 24 would push back the shift lever 12. This could be evaluated by the control unit as if the driver intended to shift from the bottom gear 1. This uncertainty is eliminated by providing for a delay lasting so about 150 msec.

The aforementioned impact of the shift lever 12 is evaluated on behalf of the driver that shifting into the bottom gear 1 is finished, so he closes the clutch. Release of the clutch pedal 8 is sensed by the detector ET, upon its signal the corresponding power amplifier T takes down the voltage from the electromagnet of the valve SK. The valve SK1 empties the cylinder space V1 of the shifting cylinder 35. The piston rod 36 is thereafter kept in position by the detent positioning means 39.

As is apparent from the foregoing, the motion of the shift lever 12 remains behind by a step from the gear change actually being carried out by the shifting cylinder 35. This "deception" does not cause any disadvantage for the driver. At the same time the shift lever 12 simulates completely the motion of the traditional transmission lever.

When the driver intends to change the gear, he presses down again on the clutch pedal 8. Upon the signal released by the detector ET the control unit 10 applies voltage to the electromagnet of the valve SK1. The signal generated by the detector ET also represents one of the permitting signals for switching on the voltage of the electromagnet M.

Thereafter the driver is pulling the shift lever 12 towards the central position. As the electromagnet M is locking the slide 21, the shift lever 12 can be displaced only against the spring 23 and only to a slight extent. However, this slight displacement suffices for the displacement of the signal transmitting element 18, and so the gap 20 with the series number +8 gets before the detectors EK1, EK2. In comparison to the previously described procedure, these will be covered by the signal transmitting element 18 in the opposite sequence. As soon as the signal transmitter element 18 is started, the control unit 10 determines from the signal of the detectors EK1, EK2 that the element 18 is moving in the opposite direction. Accordingly, it disconnects the electromagnet of the valve SK1. Simultaneously the electromagnet of the valve SK0 is connected to the voltage. In such a manner the cylinder space V1 of the shifting cylinder is emptied, whereas the central cylinder space V0 will be filled. The piston rod 36 is thus caused to move to its central position, disconnecting the bottom gear by means of the gear change element 33.

Thereafter the control unit 10 reapplies voltage onto the electromagnets of the valves SK1 and SK2, which pressurize the cylinder spaces V1, V2 of the shifting cylinder 35. In such a manner all the three cylinders are filled again, it goes without saying that the state of equibalance is kept.

As soon as the piston rod section P2 with the full cross-section moves away from the detector ES0, the signal thereof represents the second permitting signal for the release of the electromagnet, accordingly, the electromagnet frees the slide 21. In order to prevent swinging over of the shift lever 12 beyond the central position in the same shifting path, one has to wait until the shifting cylinder 35 occupies its central position. For this reason the block timing the release of the electromagnet holds for 150 msec and then disconnects the voltage of the electromagnet. Now the shift lever 12 may return to its central position. The block timing the release of the electromagnet plays an important role in this phase.

As soon as the shift lever 12 occupies its central position, shifting to the next gear may be performed, in the same way, as previously specified.

A special case should be separately mentioned when the synchronizing mechanism for one of the gears becomes damaged so that gear change cannot take place. During the period of synchronization and gear change the electromagnet normally holds back the slide 21. If gear change is not possible, the sections P1 or P2 with the full cross-section of the piston rod 36 do not arrive at the detector ES0, and in lack of the signal of the detector ES0 the unit 49 controlling the electromagnet does not disconnect the voltage from the electromagnet. That means that the shift lever 12 cannot be pushed into its extreme position in the shifting path 1-2$^x$. This happening gives rise to the same illusion for the driver as if he could not finish gear change with the traditional transmission lever. Accordingly, he is forced to search for another gear.

Now the driver moves the shift lever 12 again towards the central position, thereafter the gaps 20 of the signal transmitter plate 18 will travel in the opposite direction past the detectors EK1, EK2. The control unit 10 determines that the direction of the motion of the plate 18 changed. However, the gap 19 of the plate has not yet reached the detector EK0. As a consequence, the voltage is removed immediately from the electromagnets of the valves SK1 and SK2, the task of which was to change the gear in the desired way. Only in the cylinder space V0 of the shifting cylinder is left with pressurized air. Accordingly, the piston could return into the central position.

We should mention that if in any of the shifting paths the shift lever 12, is reversed at in any point of the path, the control unit 10 will react to its displacement in the opposite direction so that it disconnects the voltage from the electromagnets of the solenoid valves SK1, SK2 and applies voltage to the electromagnet of the valve SK0 or keeps it under voltage. In such a manner the shifting cylinder 35 brings the gear change element into the central position.

In describing the function of the shift arrangement we started from the fact that when starting the motor vehicle, both the shift lever 12 and the gear change element 33 normally occupy their neutral position. Naturally, a motor vehicle can be stopped so that the gears remain in a connected state.

It may also happen that when the car is stopped, the shift lever 12 occupies its central position, but not at the shifting path 3-4$^x$. In this case it is of utmost importance that none of the cylinder spaces of the cylinders contains pressurized air. The return springs contained in the cylinder 34 set the piston rod thereof to the shifting path 3-4$^x$, i.e., in the same way the springs 27 and 29 set the shift lever to the shifting path 3-4$^x$. In such a manner it can be achieved that the shift lever 12 remains synchronized with the selecting cylinder 34 even in the disconnected state of the shift control device. It goes without saying that the solution can be realized also without springs. In this case when the shift control device is put under voltage, the selecting cylinder 34 must take up first the same position as the shift lever 12.

In connection with the delayed release and holding of the electromagnet it should be mentioned that this can be realized otherwise than electronically. If on the piston rod 36 the section P0 is shorter than the full stroke length, the detector ES0 will release a signal earlier than the arrival of the piston rod 36 into the extreme position and, when travelling backwards, later than the start from the extreme position. So delay also can be obtained by the proper design of the section P0.

Figure 16:
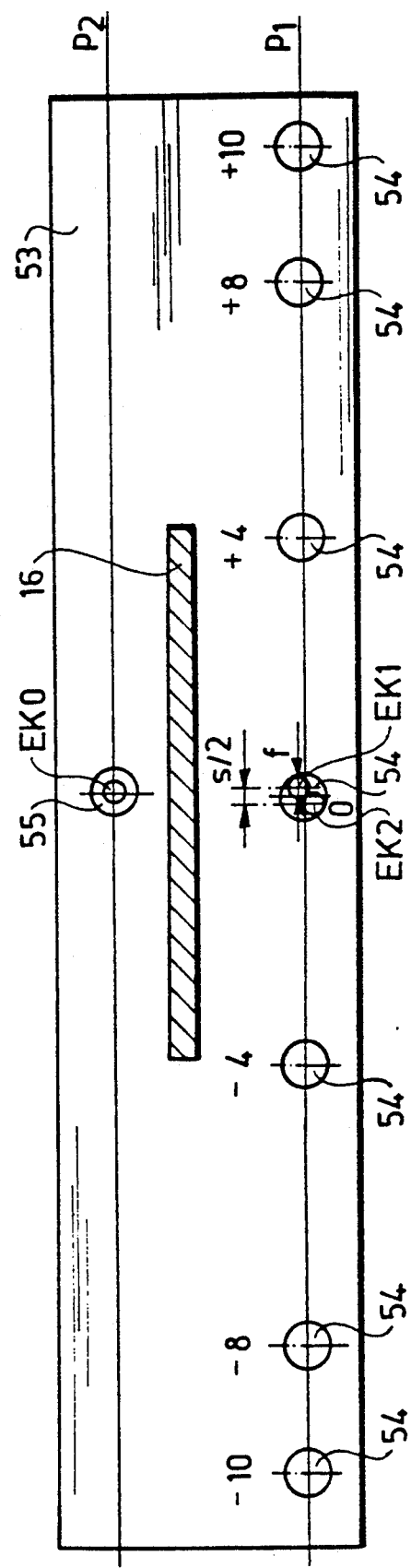
FIG. 16. illustrates another version of the signal transmitting element of the driver's shift control unit.

The signal transmitter plate 18 may have several kinds of design, the illustrated comb-shaped is not obligatory. FIG. 16 illustrates another possible version. In that modification the signal transmitter plate 53 may be identical with the signal transmitter plate 18 in respect to position and shape. The difference 75 that instead of the gaps, circular apertures are provided. In the motion path p1 seven apertures 54 are provided, and in the path p2 one aperture 55 is formed.

The task of the apertures 54 is the same as the task of the gaps 20, so they were indicated with the same series numbers as the positions occupied by the gaps 20. The aperture 55 is positioned in the same way as the gap 19.

Detectors EK1, EK2 and E0 are arranged along the motion paths p1, p2. In this case, too, the spacing s/2 between the detectors EK1 and EK2 corresponds to the half of the visual field f. This value s/2 could be higher. However, it does not seem to be expedient to select a higher value than the visual field f, because the function of the shift control device would then be inaccurate.

The signal transmitter plate 53 fulfills its task in the same way as the signal transmitter plate 18.

Figure 17:
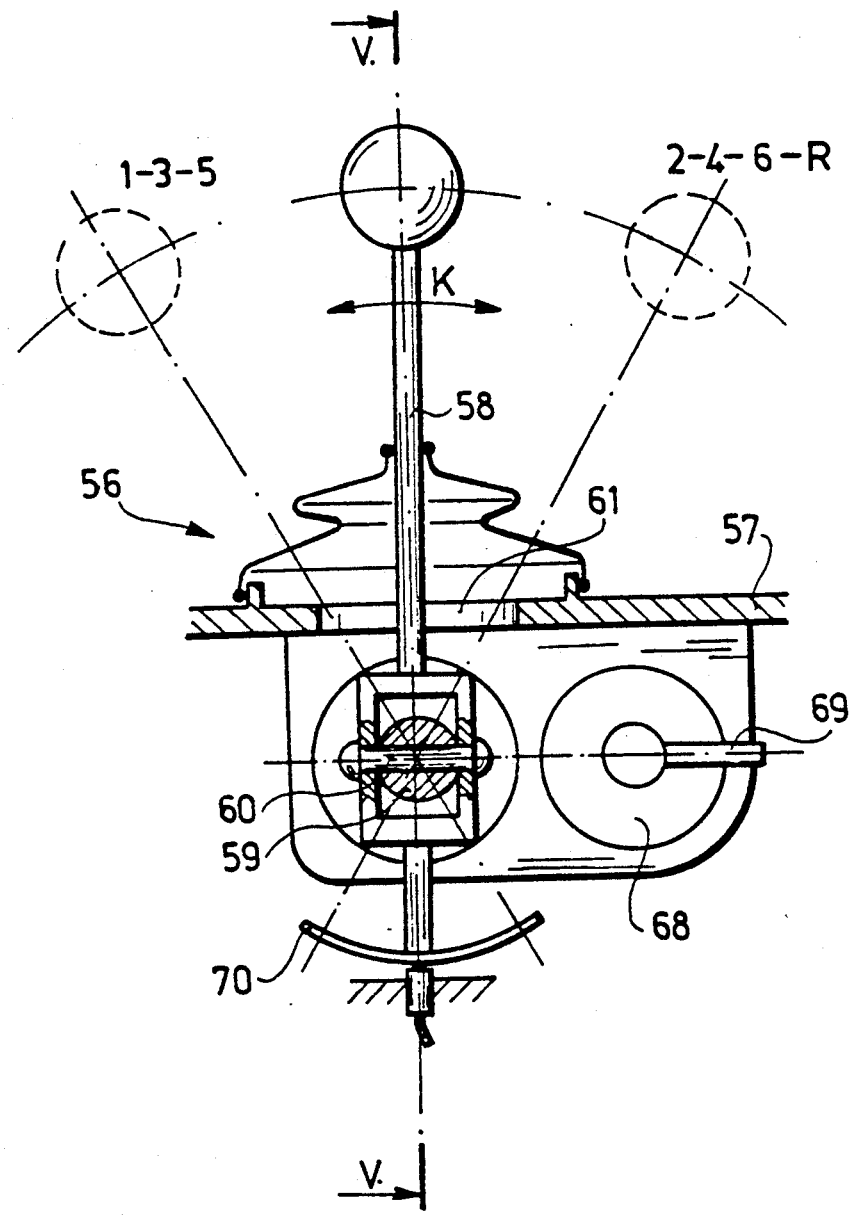
FIG. 17 to 19 are three sectional views of a modified form of driver's control unit.
Figure 18:
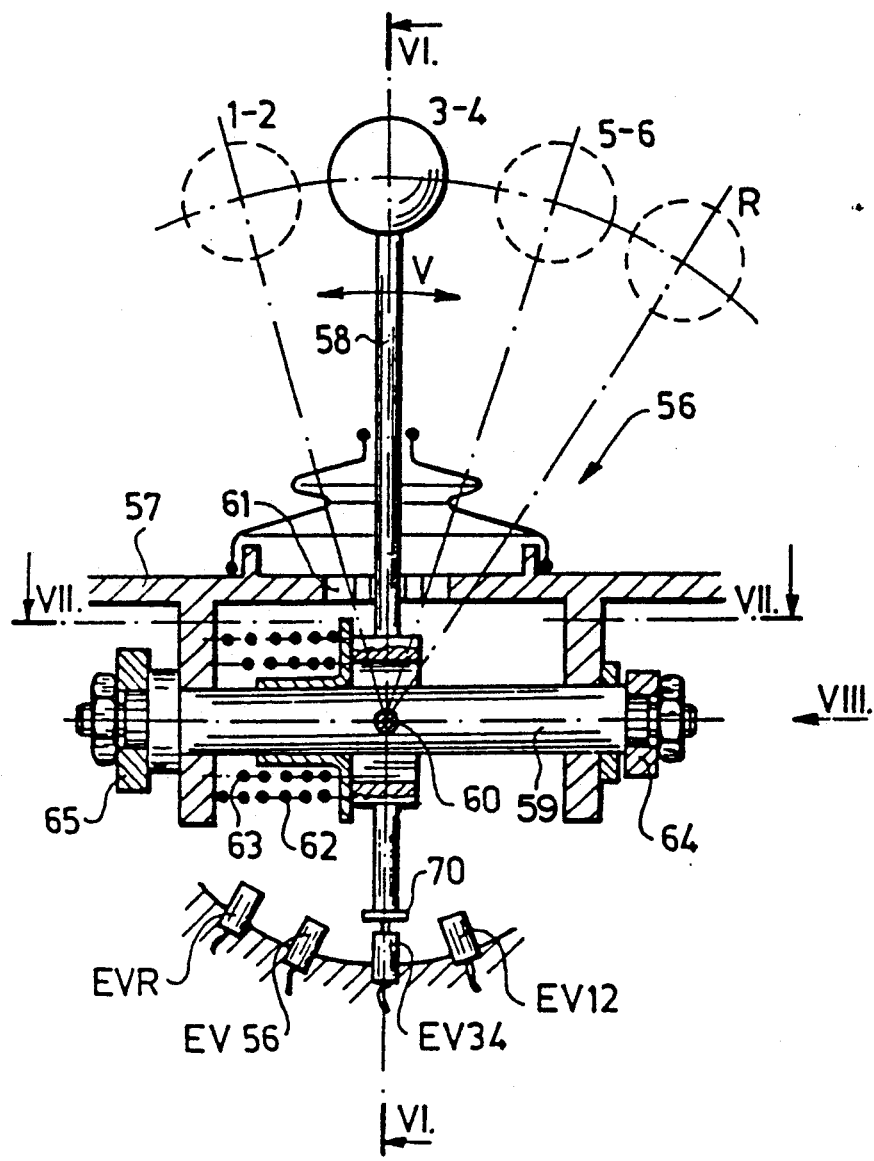
Figure 19:
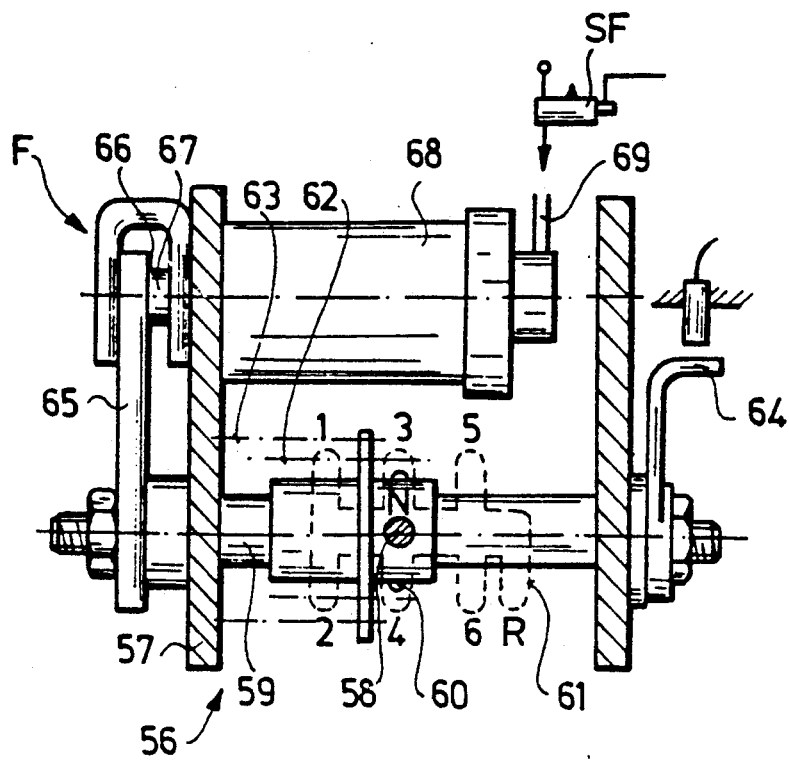

Another possible construction of the shift control unit is to be seen in FIGS. 17 to 19. A modified shift control unit 56 is illustrated, for the sake of simplicity, with a construction which corresponds to the function of the earlier specified transmission 11. That means that the shift control unit 56 can be also characterized by the circuit diagram 52 (FIG. 4) and the gear change unit 9 of the transmission 11 is built-up in the same way.

In the housing 57 of the shift control unit 56 the shift lever 58 is mounted on a shaft 59 so as to be rotated around its axis in the shifting direction k and around the pivot 60 running perpendicularly thereto in the selecting direction v. It is guided in a guide template 61 formed in the upper plate of the housing 57. This guide has essentially the same circuit diagram as the diagram 52 of FIG. 4.

A spring 62, arranged around the shaft 54, keeps the shift lever 58 in its neutral position N. The spring bears against the shift lever 58 with its one end, while with the other end it bears against the housing 57. To prevent unintended shifting of the reverse gear there is a shorter spring 63 arranged within the spring 62.

At the end of the shift lever 58, a sensing plate 70 is mounted which actuates the detectors EV12, EV34, EV56 and EVR arranged in the direction of selection v. These detectors are based on the principle of inductance.

Figure 20:
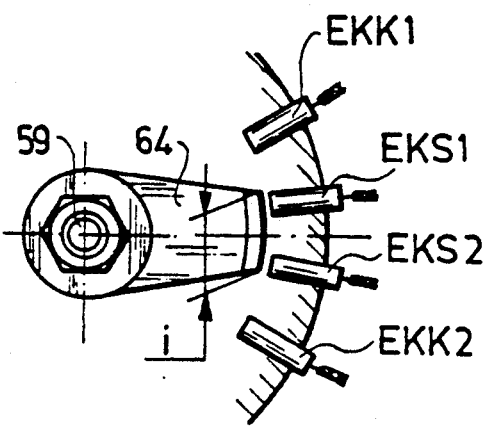
FIG. 20. is a view showing position sensing transmitters arranged in the shifting direction.

A signal transmitter element 64 is fixed to one end of the shaft 54. As shown in FIG. 20, the signal transmitter element has a wider curved mantle surface. Detectors EKK1, EKS1, EKS2, EKK2 are arranged along the path of the element 64 for sensing the motion in direction of shifting k. These detectors are also based on the principle of inductance.

The length of arc i of the mantle of signal transmitter element 64 is so selected and the detectors EKK1, EKS1, EKS2, EKK2 are so arranged in relation to each other that the signal transmitter element 64 can cover all the detectors individually and also simultaneously two adjacent detectors.

Brake plate 65 is fixed to the other end of the shaft 54. A pneumatic working cylinder 68 is mounted on the housing 57 and arranged perpendicular to the frictional surface of brake plate 65. The pneumatic working cylinder is dimensioned so that when it is subjected to pressure, the piston rod 67 should be able to apply a force on the frictional surface, which can be overcome by a mediocre manual force exerted with the shift lever 58. The brake plate 65 and the pneumatic working cylinder 68 form together the locking-braking construction F.

The pneumatic working cylinder 68 is connected to the source of pressurized air via the conduct 69 and a solenoid valve SF.

Connection between the shift control unit 56 and the gear change unit 9 is established by means of a control unit 10 of the type indicated in FIG. 1.

The shift control unit and within the unit the shift lever 56 operates as follows:

Signal generation in the selecting direction v and reaction of the gear change unit 9 are identical with the previously described solution If the gear change unit 9 did not choose the path of shifting corresponding to the position of the shift lever 58, the control unit applies voltage to the solenoid valve SF. The valve SF fills the pneumatic working cylinder 68 and the piston rod 67 thereof is pressed against the frictional surface 66. In such a manner the brake plate 65 gets held and the displacement requires a higher manual force. This fact indicates some irregularity, giving the proper information for the driver. If the gear change unit 9 chooses the proper path of shifting, the shift lever 58 can be easily displaced in the selected path of shifting.

In the central position of the shift lever 58 the signal transmitter element 64 covers two detectors EKS1 and EKS2. Upon the simultaneous signal of the detectors EKS1 and EKS2 the control unit keeps the cylinder spaces V0, V1, and V2 of the shifting cylinder in a filled state.

When the driver intends to shift to the position 1 of the bottom gear, he displaces the shift lever 58 in the shifting direction k, along the path of switching 1-2$_x$, in the direction toward the bottom gear. Simultaneously with the displacement of the shift lever 58 the signal transmitter element 64 is rotated away from the detector EKS2. Now it covers only the detector EKS1. Upon the independent signal of the detector EKS1 the control unit gives the command for emptying the cylinder space V2 of the shifting cylinder 35. By this process synchronization of the bottom gear begins with the lower stage of the compressive force. At the same time the control unit applies voltage onto the electromagnet of the valve SF, which is filling the pneumatic working cylinder 68, the cylinder 68 brakes the plate 65.

With the brake plate 65, the shift lever 58 can be displaced only with difficulty. If the driver overcomes this braking effect and pushes the shift lever 58 forward, the signal transmitter element 64 makes a further turn, too, and covers simultaneously the detectors EKS1, and EKK1. Upon the simultaneous signal thereof the control unit gives the command for emptying the cylinder space V0 of the shifting cylinder 35. Thereafter shifting to the bottom gear takes place with higher force.

As soon as the shifting cylinder 35 finishes the gear change to the bottom gear, the control unit releases the braking-locking construction F by disconnecting the electromagnet of the valve SF. The driver displaces the shift lever 58 to the extreme position in the full length of the path of shifting 1-2$^x$, now the signal transmitter element 64 turns and leaves the detector EKS1 and covers only the detector EKK1. Upon the independent signal of the detector EKK1 the control unit gives the command for emptying the cylinder space V1 of the shifting cylinder and for closing the braking-locking construction F. The change to low gear is finished. All the three cylinder spaces of the shifting cylinder 35 are empty, and the shift lever 58 is fixed by the brake means.

When the driver intends to disconnect the bottom gear, he displaces the shift lever 58 to the central position. Now the transmitter element 64 covers again also the detector EKS1. In this case the signals of the detectors EKK1 and EKS1 appear in the opposite order of sequence in the control unit, the control unit reacts so that it gives the command to fill only the cylinder space V0 of the shifting cylinder. In such a manner the bottom gear becomes disconnected.

As soon as the signal transmitter element 64 leaves the detector EKK1, i.e., when the shift lever 58 is pulled back, the control unit gives the command for releasing the braking-locking construction F, so the shift lever 58 can easily be returned to its central position.

Figure 21:
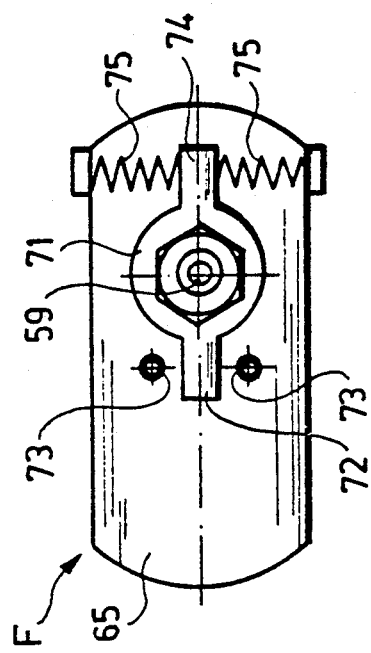
FIG. 21. illustrates a possible version of the braking-locking means.

With the shift control unit specified it may present some uncertainty for the untrained driver that the braking-locking construction F does not positively lock in the required situations; it brakes only. This uncertainty can be eliminated by means of the solution according to FIG. 21. With this solution, the brake plate 65 rotates freely on the shaft 54. A two-armed rocker 71 is fixed to the shaft of the shift control unit. One arm 72 of the rocker 71 is formed as limit stop, which may move between spaced impact surfaces 73 on the plate 65. The other arm 74 of the rocker 71 is supported by opposed springs 75 each bearing on the plate 65.

With the braking-locking device as described above, the piston rod 67 of the pneumatic working cylinder 68 keeps the slide locked in an undisplaceable way. The impact surfaces 73 allow the displacement of the limit stop 72 to such an extent that when actuating the detectors EKK1, EKS1, EKS2, EKK2 with the shift lever 58 the two neighboring positions in relation to the fixed position could be established. The springs 75 play the same role as to the springs 23 and 24 at the earlier described shift control unit 7.

It will be understood that the signal transmitters of the shift control unit 56, as presented can be formed for acting in the shifting direction k in the same way as with the shift control unit 7. It is also obvious that the shift control unit 56 can be built-up with photo cell sensors instead of the inductive detectors.

It should also be mentioned that the pneumatic cylinder displacing the gear change element of the transmission in the shifting direction may be built-up so that identical pressure yields identical compressive force in all the three positions. In this case a decompressor must be inserted between the valve establishing the central position and the source of the pressurized air.

For the sake of order it should be mentioned that in the braking-locking construction F in particular with the last presented embodiment, a hydraulic working cylinder can be also utilized.

We claim:

1. A shift cylinder system for effecting shifting operations of a mechanical transmission, which comprises
   (a) a cylinder body,
   (b) a piston rod movable in said cylinder body from a central position to a shift position and projecting from at least one end thereof,
   (c) a pair of spaced piston elements carried by said piston rod and defining a plurality of working chambers in said cylinder,
   (d) said working chambers including a smaller area chamber in the center of said cylinder body and two larger area chambers at the ends thereof,
   (e) first fluid passage means communicating with the respective end chambers for selectively pressurizing said end chambers,
   (f) second fluid passage means in said piston rod communicating with the central chamber for selectively pressurizing the same, and
   (g) shift control means for sequentially pressurizing said central chamber and a selected end chamber to effect partial movement of said piston rod under lower force in a predetermined shifting direction, and for subsequently exhausting said central chamber to cause said piston rod to continue moving under higher force in said predetermined direction, into said shift position for effecting a shifting operation.

2. Apparatus according to claim 1, further characterized by
   (a) said piston rod having an enlarged central portion,
   (b) said piston elements being carried slidably on said enlarged central portion for limited movement thereon,
   (c) end stop means on said enlarged central portion to limit outward movement of said piston elements thereon when said central chamber is pressurized, and
   (d) stop means in said cylinder body to limit movement of said piston elements toward the ends of said cylinder body, whereby, when said central chamber alone is pressurized, said piston rod is moved to a predetermined central position within said cylinder body.

3. Apparatus according to claim 2, further characterized by
   (a) detent means associated with said piston rod for retaining said rod in said central position or in a shifted position in the absence of pressurization of any of said chambers.

4. A remote shift control system for manual transmissions, which comprises,
   (a) a shift actuator provided with an actuator element having a neutral position and a shift position,
   (b) said shift actuator being connected to said transmission whereby upon movement of said actuator element from said neutral position to said shift position said transmission is shifted into a predetermined gear,
   (c) fluid control means for energizing said actuator element,
   (d) position sensor means responsive in part to the position of said actuator element to control said fluid control means whereby said actuator element is moved, during a first phase of its movement from a neutral position toward a shift position, under low force and, during a second phase of its movement into a shift position, under a higher force.

5. A shift lever mechanism for a remote vehicle shifting system which comprises,
   (a) a shift lever pivotally mounted for movement in a path-selecting direction into selective alignment with a plurality of shifting paths and for movement in a shifting direction along any of said shifting paths into and out of shift positions,
   (b) a braking member associated with said shift lever and movable with said lever in its movements in the shifting directions,
   (c) controllably operable brake means associated with said braking member for controllably restraining said braking member and said shift lever against free movement in a shifting direction,
   (d) said brake means being actuated during movements of said shift lever along a shift path toward a shift position, to temporarily restrain said shift lever whereby further movement of said lever is effected against increased resistance emulating the resistance of mechanically engaging gears of a direct-shifted mechanical transmission,
   (e) said brake member comprising a magnetic slide element associated with said shift lever and movable therewith,
   (f) resilient means interposed between said slide element and said shift lever in the shifting directions, whereby movement of said shift lever in the shifting directions cause said slide element to be urged by said resilient means also to move in said shifting directions, and
   (g) electromagnet means associated with said slide element and operative, during movements of said shift lever along a shift path toward a shift position, to temporarily lock said slide in a fixed position whereby further movement of said lever is effected against the resistance of said resilient means.

6. Apparatus according to claim 5, further characterized by, (a) sensor means for detecting the positions of said shift lever along a shifting path, (b) said sensor means being operative, upon said lever reaching a position along a shifting path generally corresponding to a position of initial engagement and synchronization of transmission gears, to actuate said electromagnetic means and lock said slide element.

7. Apparatus according to claim 6, further characterized by, (a) remote actuator means for effecting shifting of the vehicle transmission upon movement of the shift lever along a shifting path to a position causing locking of said slide element, and (b) sensor means responsive to operation of said remote actuator means to release said slide element and allow continued movement of said shift lever to the end of its path in the shifting direction.

8. A shift lever mechanism for a remote vehicle shifting system which comprises, (a) a shift lever pivotally mounted for movement in a path-selecting direction into selective alignment with a plurality of shifting paths and for movement in a shifting direction along any of said shifting paths into and out of shift positions, (b) a braking member associated with said shift lever and movable with said lever in its movements in the shifting directions, (c) controllably operable brake means associated with said braking member for controllably restraining said braking member and said shift lever against free movement in a shifting direction, (d) said brake means being actuated during movements of said shift lever along a shift path toward a shift position, to temporarily restrain said shift lever whereby further movement of said lever is effected against increased resistance emulating the resistance of mechanically engaging gears of a direct-shifted mechanical transmission, (e) control means for said brake means comprising sensors for detecting the extent of movement of said shift lever in a shifting direction, (f) said control means being responsive to a predetermined movement of said shift lever toward a shift position to actuate said brake means, (g) said control means being responsive to further movement of said shift lever toward said shift position to de-actuate said brake means and permit free full movement of said shift lever into said shift position, and (h) said control means being responsive to said shift lever reaching said shift position to re-actuate said brake means, (i) said control means comprising an elongated plate movable with said shift lever and formed with a plurality of spaced openings, and (j) photocell sensors associated with said openings for detecting the movements of said plate.

9. A shift lever mechanism for a remote vehicle shifting system which comprises, (a) a shift lever pivotally mounted for movement in a path-selecting direction into selective alignment with a plurality of shifting paths and for movement in a shifting direction along any of said shifting paths into and out of shift positions, (b) a braking member associated with said shift lever and movable with said lever in its movements in the shifting directions, (c) controllably operable brake means associated with said braking member for controllably restraining said braking member and said shift lever against free movement in a shifting direction, (d) said brake means being actuated during movements of said shift lever along a shift path toward a shift position, to temporarily restrain said shift lever whereby further movement of said lever is effected against increased resistance emulating the resistance of mechanically engaging gears of a direct-shifted mechanical transmission, (e) a shift cylinder associated with said shift lever mechanism, (f) means for operating said cylinder with higher and lower levels of force, (g) first control means for operating said cylinder with lower levels of force during initial movements of said shift lever toward a shift position, for effecting synchronization of gears, and (h) second control means for operating said cylinder with higher levels of force during further movements of said shift lever, against the resistance of said brake means, toward said shift position.

10. Apparatus according to claim 9, further characterized by (a) said shift cylinder having piston means therein defining with said cylinder opposite end chambers and a central chamber, (b) first control means for pressurizing said central chamber to center said piston means for shifting said transmission into a neutral position, (c) second control means actuated by said shift lever, upon initial movement thereof toward a shift position, to pressurize an end chamber and said central chamber of said shift cylinder to move said piston under lower force in a direction to effect synchronism of selected gears, and (d) third control means actuated by said shift lever, upon further movement thereof toward a shift position, to exhaust the central chamber of said shift cylinder, whereby said piston continues to move in a shifting direction under higher force for effecting engagement of said selected gears.

11. A shift lever mechanism for a remote vehicle shifting system which comprises, (a) a shift lever pivotally mounted for movement in a path-selecting direction into selective alignment with a plurality of shifting paths and for movement in a shifting direction along any of said shifting paths into and out of shift positions, (b) a braking member associated with said shift lever and movable with said lever in its movements in the shifting directions, (c) controllably operable brake means associated with said braking member for controllably restraining said braking member and said shift lever against free movement in a shifting direction, (d) said brake means being actuated during movements of said shift lever along a shift path toward a shift position, to temporarily restrain said shift lever whereby further movement of said lever is effected against increased resistance emulating the resistance of mechanically engaging gears of a direct-shifted mechanical transmission, (e) control means for said brake means comprising sensors for detecting the extent of movement of said shift lever in a shifting direction, (f) said control means being responsive to predetermined partial movement of said shift lever toward a shift position into a predetermined intermediate position to actuate said shifting system and said brake means,
(g) said control means being responsive to predetermined operation of said shifting system to de-actuate said brake means and permit free full movement of said shift lever into said shift position, and
(h) said control means being further responsive to said shift lever reaching said shift position to re-actuate said brake means.

* * * * *